US012703626B2

(12) United States Patent
Kang et al.

(10) Patent No.: US 12,703,626 B2
(45) Date of Patent: Aug. 11, 2026

(54) LITHIATION INDUCED POROUS Pd NANOPARTICLE/3D GRAPHENE AEROGEL COMPOSITE FOR HIGHLY REVERSIBLE HYDROGEN STORAGE BASED ON SPILLOVER PROCESS

(71) Applicant: KOREA ADVANCED INSTITUTE OF SCIENCE AND TECHNOLOGY, Yuseong-gu (KR)

(72) Inventors: Jeung Ku Kang, Yuseong-gu (KR); Min Gyu Park, Yuseong-gu (KR); Jong Hui Choi, Yuseong-gu (KR); Dong Won Kim, Yuseong-gu (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 666 days.

(21) Appl. No.: 18/056,291

(22) Filed: Nov. 17, 2022

(65) Prior Publication Data

US 2023/0150813 A1 May 18, 2023

(30) Foreign Application Priority Data

Nov. 17, 2021 (KR) ........................ 10-2021-0158201
Jan. 28, 2022 (KR) ........................ 10-2022-0013080

(51) Int. Cl.
*C01B 3/0047* (2026.01)
*B82Y 30/00* (2011.01)
*B82Y 40/00* (2011.01)
*C01B 3/0084* (2026.01)
*C01B 3/0094* (2026.01)

(52) U.S. Cl.
CPC ............ *C01B 3/0047* (2013.01); *B82Y 30/00* (2013.01); *B82Y 40/00* (2013.01); *C01B 3/0084* (2013.01); *C01B 3/0094* (2013.01)

(58) Field of Classification Search
CPC ... C01B 3/0063; C01B 3/0084; C01B 3/0094; B82Y 30/00; B82Y 40/00
See application file for complete search history.

(56) References Cited

FOREIGN PATENT DOCUMENTS

KR 10-2018-0130399 A 12/2018
KR 10-2019-0090256 A 8/2019

OTHER PUBLICATIONS

Utpalla et al., Microporous and Mesoporous Materials, (2021), v.327, p. 111409(1-9), published Sep. 8, 2021.*
Gasnier et al., Journal of Physical Chemistry, (2020), v. 124, p. 115-125.*
Sui et al., International Journal Hydrogen Energy, (2018), v.43, p. 21899-21907.*
Waiz Karim et al., "Catalyst support effects on hydrogen spillover", Nature, vol. 541, Jan. 5, 2017, pp. 68-71.

* cited by examiner

*Primary Examiner* — Yong L Chu
(74) *Attorney, Agent, or Firm* — Shih IP Law Group, PLLC.

(57) ABSTRACT

The present disclosure relates to a composite for hydrogen storage formed through lithiation and a method of preparing the same.

14 Claims, 25 Drawing Sheets

FIG. 4A(ii)

FIG. 4A(iii)

FIG. 4B(iii)

*FIG. 4H(iii)*

*FIG. 4H(iv)*

*FIG. 10E(ii)*
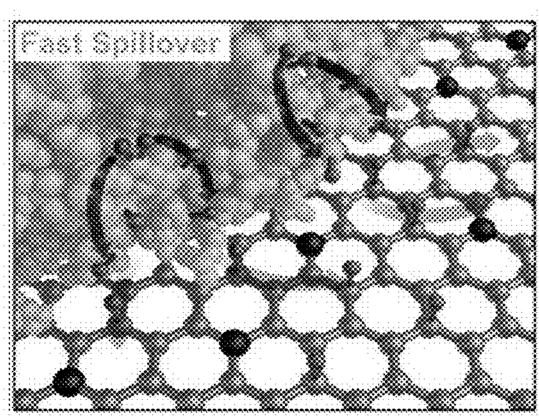

FIG. 10F

LITHIATION INDUCED POROUS Pd NANOPARTICLE/3D GRAPHENE AEROGEL COMPOSITE FOR HIGHLY REVERSIBLE HYDROGEN STORAGE BASED ON SPILLOVER PROCESS

TECHNICAL FIELD

The present disclosure relates to a composite for hydrogen storage formed through lithiation and a method of preparing the same.

BACKGROUND

Hydrogen has the highest chemical energy per mass (142 $MJ \cdot kg^{-1}$) than other chemical fuels and is a sustainable energy source that discharges only water as a by-product. However, to realize a hydrogen economy, the development of a material or method for hydrogen storage that affords high reversible capacity and fast kinetics remains a significant challenge. Hydrogen storage via compression or liquefaction requires high-pressure tanks (up to 700 bar) or cryogenic temperatures (−252.8° C.) below the boiling point of hydrogen at one atmosphere pressure. To overcome these challenges, hydrogen storage on the inner and outer surfaces of host materials via physical adsorption or chemical bonding serves as an effective solution. However, the U.S. Department of Energy (DOE) standards require the achievement of onboard hydrogen storage with the ultimate target (≥6.5 wt. %) at room temperature. Also, the desired hydrogen storage system must exhibit fast adsorption and desorption kinetics and high cycling reversibility.

The enthalpy for hydrogen adsorption at room temperature must be between 15 $kJ \cdot mol^{-1}$ and 20 $kJ \cdot mol^{-1}$. However, pristine carbonaceous materials have a low enthalpy (2 $kJ \cdot mol^{-1}$ to 3 $kJ \cdot mol^{-1}$) to adsorb hydrogen at room temperature because of the weak van der Waals forces with hydrogen; thus, hydrogen capacity via physisorption is almost zero at room temperature. Increasing the adsorption energy of hydrogen via chemisorption by decorating metal catalysts on a carbonaceous structure is a viable strategy for achieving high capacity at room temperature. The dissociated hydrogen atoms permeate the catalyst lattice to form a metal hydride or escape to the outer surface of the catalyst and migrate to the carbon surface. Subsequently, they could be bound to an edge or defect in carbon; this is known as hydrogen spillover. The control of catalyst particle size is considered to be advantageous for hydrogen dissociation and spillover. However, the increase in the catalyst mass ratio lowers the accessible active surface area because of the enlarged particle size. Furthermore, the increased mass ratio of the catalyst, which is heavier than carbon, can significantly reduce the gravimetric hydrogen capacity.

PRIOR ART LITERATURE

Non-Patent Literature

"Catalyst support effects on hydrogen spillover" Waiz Karim, Clelia Spreafico, Armin Kleibert, Jens Gobrecht, Joost VandeVondele, Yasin Ekinci & Jeroen A. van Bokhoven, Nature, 541, 68-71 (2017).

DISCLOSURE OF THE INVENTION

Problems to be Solved by the Invention

The present disclosure is conceived to provide a composite for hydrogen storage formed through lithiation and a method of preparing the same.

However, problems to be solved by the present disclosure are not limited to the above-described problems. Although not described herein, other problems to be solved by the present disclosure can be clearly understood by a person with ordinary skill in the art from the following descriptions.

Means for Solving the Problems

A first aspect of the present disclosure provides a composite for hydrogen storage, including: a nitrogen-doped porous carbonaceous structure; and a porous metal nanoparticle, and the porous carbonaceous structure and the porous metal nanoparticle have pores.

A second aspect of the present disclosure provides a method of preparing a composite for hydrogen storage, including: oxidizing a nitrogen-doped carbonaceous structure-metal nanoparticle composite; and forming pores by performing a lithiation process and a lithium removal process to the oxidized nitrogen-doped carbonaceous structure-metal nanoparticle composite to obtain the composite for hydrogen storage according to the first aspect.

A third aspect of the present disclosure provides a hydrogen carrier including the composite for hydrogen storage according to the first aspect.

Effects of the Invention

A composite for hydrogen storage according to embodiments of the present disclosure contains a porous carbonaceous structure and a porous metal nanoparticle formed through lithiation, and the surface area of the metal nanoparticle can be maximized due to its porosity. Therefore, the contact area between the porous metal nanoparticle and hydrogen molecules increases, and, thus, the dissociation of hydrogen molecules into hydrogen atoms can be accelerated. Also, the contact area between the porous metal nanoparticle and the porous carbonaceous structure increases, and, thus, the diffusion of hydrogen atoms (the migration to the porous carbonaceous structure) can be accelerated.

The composite for hydrogen storage according to embodiments of the present disclosure contains the porous carbonaceous structure and the porous metal nanoparticle, and the porous metal nanoparticle is encapsulated in pores of the three-dimensional porous carbonaceous structure. Therefore, the loss of metal nanoparticle can be reduced during repeated hydrogen storage and desorption, and, thus, the hydrogen storage life can be increased.

The composite for hydrogen storage according to embodiments of the present disclosure is subjected to an additional reduction reaction of the porous carbonaceous structure through lithiation. Therefore, the porous carbonaceous structure may have a $sp^2$ structure and thus may have improved conductivity. Accordingly, hydrogen can be easily diffused in the porous carbonaceous structure.

The composite for hydrogen storage according to embodiments of the present disclosure can achieve a high hydrogen capacity of about 5 wt % or more, about 6 wt % or more, about 6.5 wt % or more, or about 7.5 wt % or more at room temperature of from about 25° C. to about 90° C.

The composite for hydrogen storage according to embodiments of the present disclosure may have reversibility by which the hydrogen capacity can be maintained during repeated absorption and desorption.

BRIEF DESCRIPTION OF THE DRAWINGS

FIG. 10F shows hydrogen adsorption and desorption curves cycle of Li—PPd/nGA at 90° C. temperature, in accordance with an example of the present disclosure.

DETAILED DESCRIPTION

Figure 1:
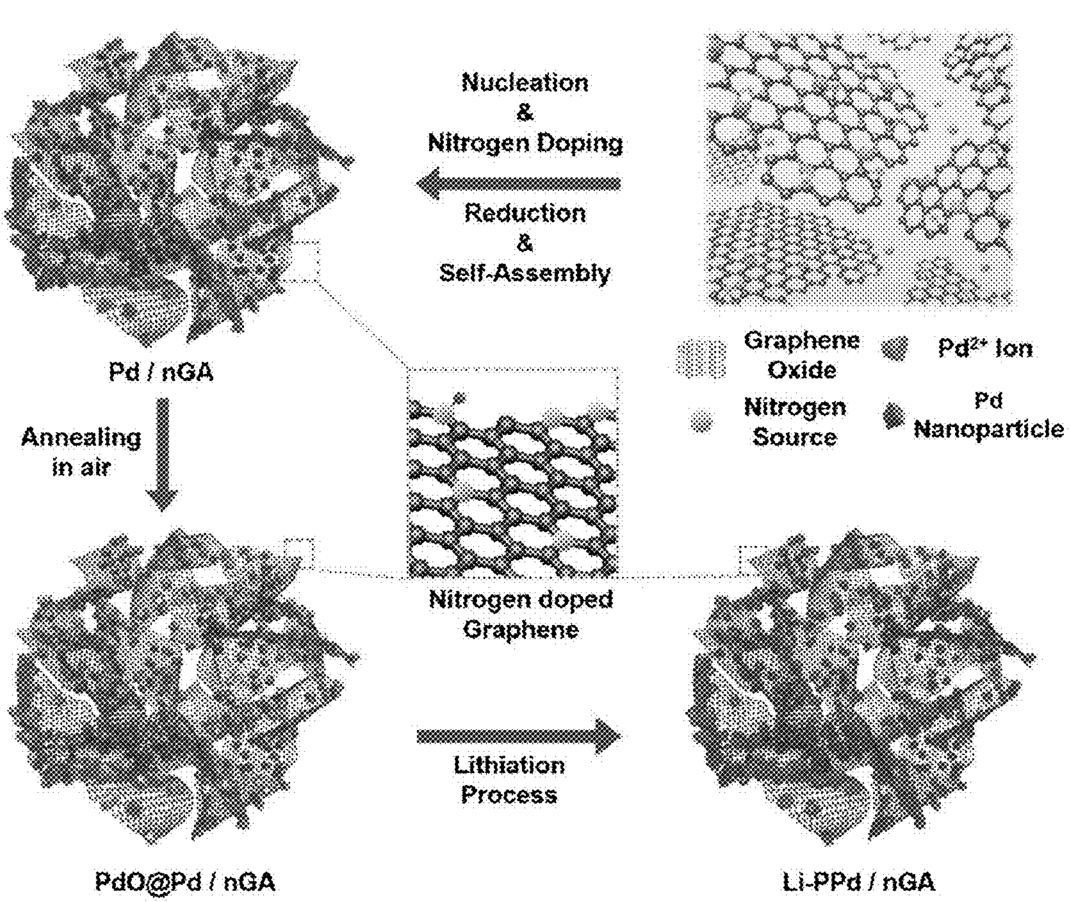
FIG. 1 shows an illustration of synthesis processes of lithiation-induced porous palladium/nitrogen-doped graphene aerogel (Li—PPd/nGA), in accordance with an example of the present disclosure.

Hereafter, embodiments and examples of the present disclosure will be described in detail with reference to the accompanying drawings so that the present disclosure may be readily implemented by a person with ordinary skill in the art. However, it is to be noted that the present disclosure is not limited to the embodiments and examples but can be embodied in various other ways. In the drawings, parts irrelevant to the description are omitted for the simplicity of explanation, and like reference numerals denote like parts through the whole document.

Throughout the whole document, the term "connected to" may be used to designate a connection or coupling of one element to another element and includes both an element being "directly connected to" another element and an element being "electronically connected to" another element via another element.

Through the whole document, the term "on" that is used to designate a position of one element with respect to another element includes both a case that the one element is adjacent to the other element and a case that any other element exists between these two elements.

Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, embodiments and embodiments of the present disclosure will be described in detail with reference to the accompanying drawings. However, the present disclosure may not be limited to the following embodiments, embodiments, and drawings.

A first aspect of the present disclosure provides a composite for hydrogen storage, including: a nitrogen-doped porous carbonaceous structure; and a porous metal nanoparticle, and the porous carbonaceous structure and the porous metal nanoparticle have pores.

In an embodiment of the present disclosure, the porous carbonaceous structure is a three-dimensional structure and may be selected from graphene, carbon nanotube, and active carbon, but is not limited thereto.

In an embodiment of the present disclosure, the porous metal nanoparticles may be Pd, Pt, Ni, or Co, but are not limited thereto.

In an embodiment of the present disclosure, the porous metal nanoparticle may become porous through an oxidation process and a lithiation; and lithium removal process. In an embodiment of the present disclosure, the porous metal nanoparticle may have the pore through the oxidation process and the lithiation; and lithium removal process.

In an embodiment of the present disclosure, the porous metal nanoparticle may include a film of a oxidized metal nanoparticle on their surface through the oxidation process.

In an embodiment of the present disclosure, the lithiation process may be performed in the film of the oxidized metal nanoparticle formed on the surface of the metal nanoparticle.

In an embodiment of the present disclosure, a size of the porous metal nanoparticle may be about 10 nm to about 200 nm, about 10 nm to about 150 nm, about 10 nm to about 100 nm, about 50 nm to about 200 nm, about 50 nm to about 150 nm, or about 50 nm to about 100 nm.

In an embodiment of the present disclosure, a size of the pore of the porous metal nanoparticle may be about 1 nm to about 10 nm. In an embodiment of the present disclosure, the size of the pore of the porous metal nanoparticle may be about 1 nm to about 10 nm, about 1 nm to about 8 nm, about 1 nm to about 6 nm, or about 1 nm to about 5 nm.

In an embodiment of the present disclosure, a specific surface area of the composite for hydrogen storage may be about 60 $m^2/g$ to about 80 $m^2/g$. In an embodiment of the present disclosure, the specific surface area of the composite for hydrogen storage may be about 60 $m^2/g$ to about 80 $m^2/g$, about 65 $m^2/g$ to about 80 $m^2/g$, about 70 $m^2/g$ to about 80 $m^2/g$, about 60 $m^2/g$ to about 75 $m^2/g$, about 65 $m^2/g$ to about 75 $m^2/g$, or about 70 $m^2/g$ to about 75 $m^2/g$. In an embodiment of the present disclosure, the specific surface area of the composite for hydrogen storage may be equal to the sum of a specific surface area of the porous carbonaceous structure and a specific surface area of the porous metal nanoparticle.

In an embodiment of the present disclosure, the porous carbonaceous structure may have pores. In a non-limiting example, the pores of the porous carbonaceous structure may be mesopores or macropores, and the mesopores or macropores of the porous carbonaceous structure may serve as a hydrogen diffusion path.

In an embodiment of the present disclosure, a size of the pore of the porous carbonaceous structure may be about 2 nm to about 1 μm. In an embodiment of the present disclosure, the pores of the porous carbonaceous structure may be hierarchical pores. In an embodiment of the present disclosure, a size of the hierarchical pore of the porous carbonaceous structure may be ranging about 2 nm to about 1 μm, and the size of the hierarchical pore of the porous carbonaceous structure may have the highest size percentage at about 500 nm.

In an embodiment of the present disclosure, hydrogen spillover may occur when hydrogen molecules adsorbed to the porous metal nanoparticle are dissociated to hydrogen atoms and the hydrogen atoms migrate to the porous carbonaceous structure.

In an embodiment of the present disclosure, the porous metal nanoparticle may have an increased surface area due to the pores. Therefore, the contact area between the porous metal nanoparticle and the hydrogen molecules increases, and, thus, the dissociation of hydrogen molecules into hydrogen atoms can be accelerated. Also, the contact area between the porous metal nanoparticle and the porous carbonaceous structure increases, and, thus, the migration of the hydrogen atoms to the porous carbonaceous structure can be accelerated.

In an embodiment of the present disclosure, the pores of the porous carbonaceous structure serve as a diffusion path of the hydrogen molecules and atoms and thus enable easy diffusion of hydrogen.

In an embodiment of the present disclosure, the porous carbonaceous structure may have a $sp^2$ structure due to an additional reduction reaction through the lithiation process and thus may have improved conductivity. Accordingly, the migration (diffusion) of hydrogen in the porous carbonaceous structure can be accelerated.

In an embodiment of the present disclosure, the porous carbonaceous structure may be doped with nitrogen and thus may facilitate the dissociation and migration of hydrogen.

In an embodiment of the present disclosure, the porous metal nanoparticle may be encapsulated in the pores of the porous carbonaceous structure. Therefore, the loss of the composite for hydrogen storage and the porous metal nanoparticle during hydrogen dissociation and spillover can be suppressed.

In an embodiment of the present disclosure, a hydrogen capacity of the composite for hydrogen storage may be about 5 wt % to about 10 wt %. In an embodiment of the present disclosure, the hydrogen capacity of the composite for hydrogen storage may be about 5 wt % to about 10 wt %, about 5.5 wt % to about 10 wt %, about 6 wt % to about 10 wt %, about 6.5 wt % to about 10 wt %, about 7 wt % to about 10 wt %, about 7.5 wt % to about 10 wt %, or about 8 wt % to about 10 wt %.

In an embodiment of the present disclosure, the hydrogen capacity of the composite for hydrogen storage may be obtained at a temperature ranging about 20° C. to about 100° C. In an embodiment of the present disclosure, the hydrogen capacity of the composite for hydrogen storage may be obtained at the temperature ranging about 20° C. to about 100° C., about 25° C. to about 100° C., about 20° C. to about 90° C., or about 25° C. to about 90° C.

In an embodiment of the present disclosure, the hydrogen spillover of the composite for hydrogen storage may be an endothermic reaction. Thus, the hydrogen capacity of the composite for hydrogen storage may increase as the temperature decreases.

In an embodiment of the present disclosure, a hydrogen adsorption activation energy of the composite for hydrogen storage may be about 15 $kJ{\cdot}mol^{-1}$ to about 20 $kJ{\cdot}mol^{-1}$. In an embodiment of the present disclosure, a hydrogen adsorption activation energy of the composite for hydrogen storage may be about 15 $kJ{\cdot}mol^{-1}$ to about 20 $kJ{\cdot}mol^{-1}$, about 15 $kJ{\cdot}mol^{-1}$ to about 19 $kJ{\cdot}mol^{-1}$, about 15 $kJ{\cdot}mol^{-1}$ to about 18 $kJ{\cdot}mol^{-1}$, about 15 $kJ{\cdot}mol^{-1}$ to about 17 $kJ{\cdot}mol^{-1}$, or about 15 $kJ{\cdot}mol^{-1}$ to about 16 $kJ{\cdot}mol^{-1}$.

A second aspect of the present disclosure provides a method of preparing a composite for hydrogen storage, including: oxidizing a nitrogen-doped carbonaceous structure-metal nanoparticle composite; and forming pores by performing a lithiation process and a lithium removal process to the oxidized nitrogen-doped carbonaceous structure-metal nanoparticle composite to obtain the composite for hydrogen storage according to the first aspect.

Detailed descriptions on the second aspect of the present disclosure, which overlap with those on the first aspect of the present disclosure, are omitted hereinafter, but the descriptions of the first aspect of the present disclosure may be identically applied to the second aspect of the present disclosure, even though they are omitted hereinafter.

In an embodiment of the present disclosure, the metal nanoparticle may be Pd, Pt, Ni, or Co.

In an embodiment of the present disclosure, the nitrogen-doped carbonaceous structure-metal nanoparticle composite may be formed by growing the metal nanoparticle on the nitrogen-doped carbonaceous structure.

In an embodiment of the present disclosure, the nitrogen-doped carbonaceous structure-metal nanoparticle composite may be oxidized by performing heat treatment at a temperature ranging about 200° C. to about 400° C. in an air atmosphere.

In an embodiment of the present disclosure, when the nitrogen-doped carbonaceous structure-metal nanoparticle composite is oxidized, a film of oxidized metal nanoparticle may be formed on the surface of the metal nanoparticle.

In an embodiment of the present disclosure, the lithiation process may be electrochemically performed. In an embodiment of the present disclosure, the lithiation process may be performed by connecting the oxidized nitrogen-doped carbonaceous structure-metal nanoparticle composite as a working electrode and lithium as a counter electrode to manufacture a coin cell in the presence of electrolyte and then performing a single galvanostatic charging process.

In an embodiment of the present disclosure, the lithiation process may be performed according to the following Reaction Formula 1.

$$MO_x+2Li+2e^- \rightarrow M+LiO_2; \qquad \text{[Reaction Formula 1]}$$

In an embodiment of the present disclosure, the lithiation process may be performed in a film $MO_x$ of the oxidized metal nanoparticle formed on the surfaces of the metal nanoparticle. In an embodiment of the present disclosure, through the lithiation process, $LiO_2$ may be generated while the film $MO_x$ of the oxidized metal nanoparticle is reduced to metal nanoparticle M.

In an embodiment of the present disclosure, the lithium removal process may be performed by washing the nitrogen-doped carbonaceous structure-metal nanoparticle composite after the lithiation process. In an embodiment of the present disclosure, through the lithium removal process, the $LiO_2$ may be removed from the nitrogen-doped carbonaceous structure-metal nanoparticle composite.

In an embodiment of the present disclosure, the lithium removal process may be performed by washing the nitrogen-doped carbonaceous structure-metal nanoparticle composite in a solvent, and the solvent may be acetone, lower alcohol, and/or water, but may not be limited thereto.

In an embodiment of the present disclosure, a process of washing the nitrogen-doped carbonaceous structure-metal nanoparticle composite in a electrolyte may be further performed before the nitrogen-doped carbonaceous structure-metal nanoparticle composite is washed in the solvent. In an embodiment of the present disclosure, the electrolyte may be ethyl carbonate and/or diethyl carbonate, but may not be limited thereto.

A third aspect of the present disclosure provides a hydrogen carrier including a composite for hydrogen storage according to the first aspect.

Detailed descriptions on the third aspect of the present disclosure, which overlap with those on the first aspect and second aspect of the present disclosure, are omitted hereinafter, but the descriptions of the first aspect and the second aspect of the present disclosure may be identically applied to the third aspect of the present disclosure, even though they are omitted hereinafter.

In an embodiment of the present disclosure, the hydrogen carrier may be applied to a hydrogen tank or a hydrogen fuel cell, but may not be limited thereto. In an embodiment of the present disclosure, the hydrogen carrier stores hydrogen not in the form of a gas of large volume but in the form of dissociated hydrogen molecules and thus can store hydrogen in a compressed container. Therefore, its availability can be improved.

Hereinafter, the present disclosure will be explained in more detail with reference to Examples. However, the following Examples are illustrative only for better understanding of the present disclosure but do not limit the present disclosure.

EXAMPLES

Example 1: Synthesis of Nitrogen-Doped Graphene Aerogel (nGA) Bearing Lithiation-Induced Porous Pd (Denoted as Li—PPd/nGA)

Li—PPd/nGA was synthesised via the following three-step process (FIG. 1).

1) Synthesis of Palladium/Nitrogen-Doped Graphene Aerogel (Pd/nGA) and Palladium Oxide@Palladium/Nitrogen-Doped Graphene Aerogel (PdO@Pd/nGA)

Figure 2A:
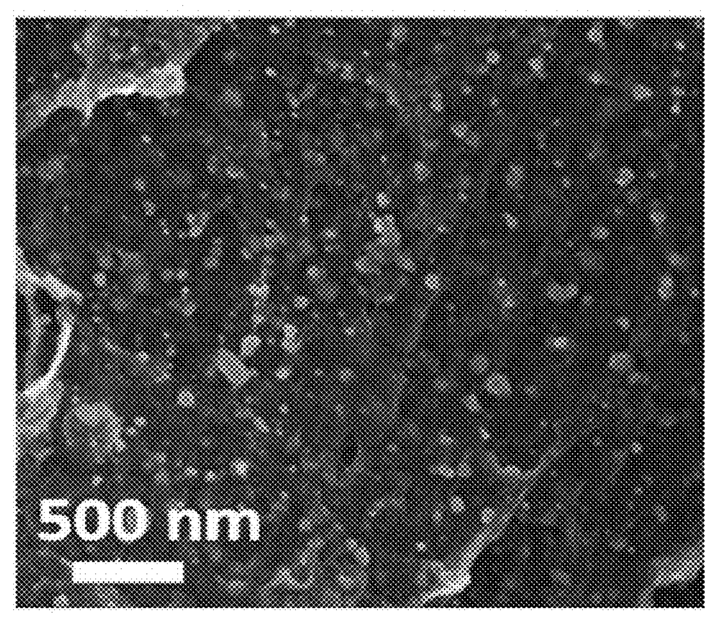
FIGS. 2A to 2C show scanning electron microscopy (SEM) (FIG. 2A) and scanning transmission electron microscopy (STEM) (FIGS. 2B and 2C) images of palladium/nitrogen-doped graphene aerogel (Pd/nGA) respectively, in accordance with an example of the present disclosure.
Figure 2B:
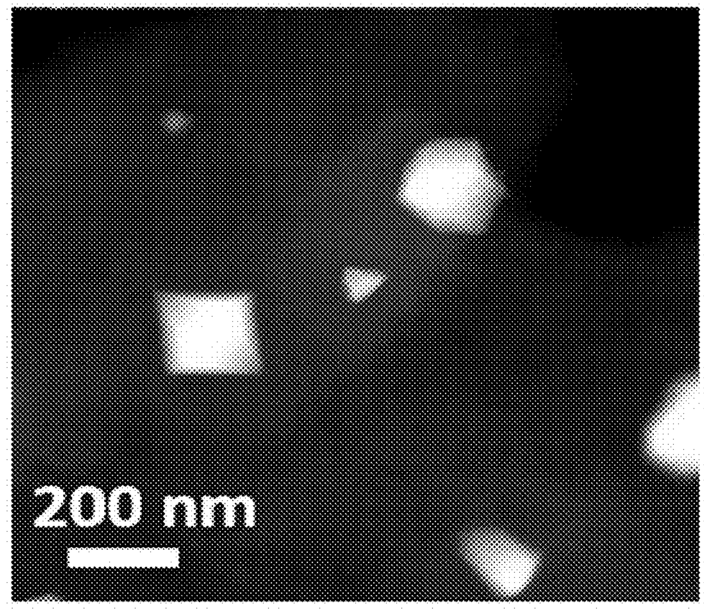
Figure 2C:
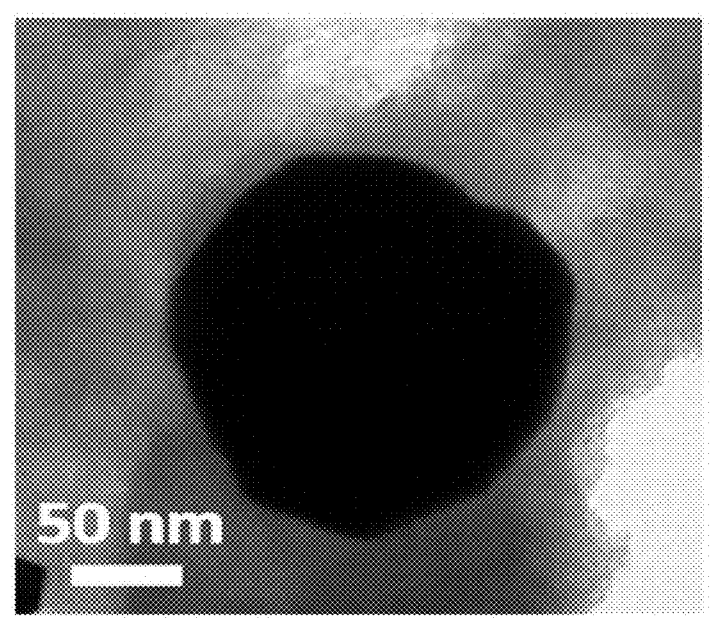

90 mg of Palladium chloride (II) was dissolved into a 5 ml deionized water. Then, hydrochloric acid is added to this solution to make an acidic PH, and then sonication is performed for 1 hour. Then this solution was re-dispersed dropwise into 500 mg of urea dissolved 30 ml of 3 mg/ml graphene oxide aqueous solution and transferred into a 50 mL Teflon-lined stainless-steel autoclave. The mixture was sealed and heated at 140° C. for 18 h and was then left to cool down to room temperature. The product was freeze-dried to maintain the 3D structure at 80° C. overnight. Referring to FIGS. 2A to 2C, we can confirm that Pd particles grown on graphene sheets have the size of 50 nm to 100 nm and smooth surface. After drying, the black Pd/nGA sample was annealed under air atmosphere at 300° C. for 2 h to oxidize to Pd to PdO.

2) Synthesis of Lithiation-Induced Porous Palladium/Nitrogen-Doped Graphene Aerogel (Li—PPd/nGA)

A 2032-type coin cell was employed to synthesize Li—PPd/nGA. The Pd@PdO/nGA was used as a working electrode by mixing the Pd@PdO/nGA and polyvinylidene fluoride (PVDF) binder in a mass ratio of 9:1 in N-methyl-2-pyrrolidinone (NMP). The mixed slurry was coated on Cu foil and dried at 80° C. in a vacuum oven overnight. The coin cell was assembled with the Pd@PdO/nGA working electrode and Li metal as a counter and reference electrode, and $LiPF_6$ (1 M) in ethyl carbonate (EC)/diethyl carbonate (DEC) (1:1 in volume) as an electrolyte. The cell was discharged for lithiation to 0.01 V vs. $Li^+$/Li at a current density of 10 mA/g. While Pd@PdO/nGA working electrode was discharged to 0.01 V vs. $Li^+$/Li, it reacted with lithium ions and was reduced to Pd metal to produce Li—PPd/nGA. After discharged, the coin cell was disassembled and the Li—PPd/nGA electrode was collected and soaked in diethyl carbonate overnight to remove the residual electrolyte. Then, collected samples were additionally washed with deionized water, and freeze-dried for 3 days.

After lithiation and wash, the Pd metal particles have a rough surface and more hierarchical nanopores than Pd/nGA. These structural changes increase the area for contact with hydrogen molecules, leading to enhanced hydrogen dissociation. In addition, it strengthens the contact between the graphene sheets and Pd metal particles, making the diffusion process of hydrogen ions into the graphene sheets smooth. Additionally, the graphene sheets were reduced through the lithiation process, which leads to an improvement in the conductivity of the graphene sheets, thereby facilitating the diffusion of hydrogen ions in the graphene sheets.

Figure 3:
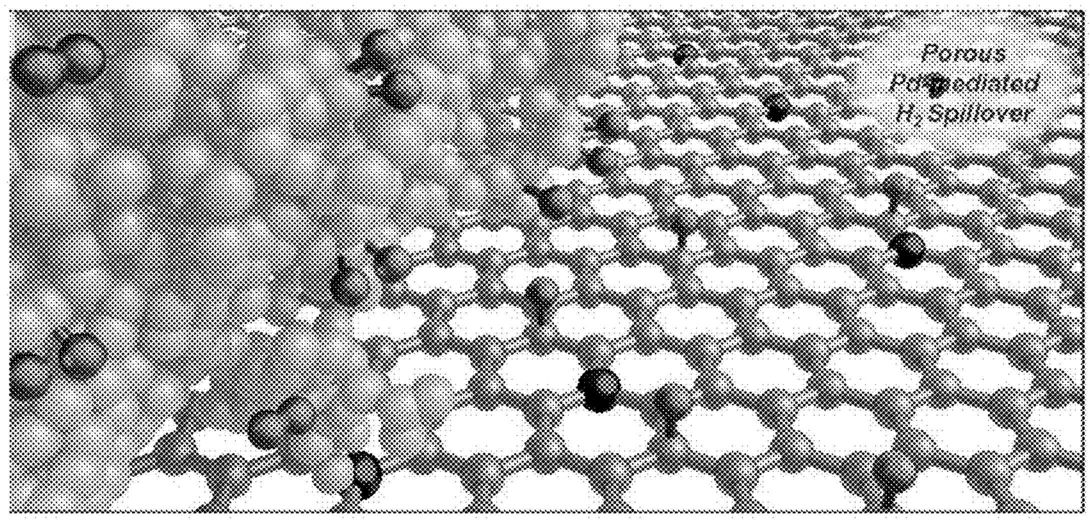
FIG. 3 shows a schematic illustration of the mechanism of hydrogen spillover between Li—PPd and nGA, in accordance with an example of the present disclosure.

FIG. 3 illustrates the mechanism of hydrogen spillover between lithiation-induced porous Pd and nGA sheets. The hydrogen spillover mechanism includes three steps: adsorption of hydrogen molecules, dissociation into hydrogen atoms, and migration to the nGA sheets. It is notable that the lithiation-induced porous structure of Pd nanoparticles promotes the adsorption of hydrogen owing to the high surface area. In addition, porous Pd facilitates faster hydrogen migration onto graphene sheets than single-atom Pd particles. Moreover, Li—PPd/nGA has been shown to result in high reversible hydrogen capacities (>7 wt. %) at room temperature.

Comparison Example: Synthesis of Palladium/Nitrogen-Doped Graphene Aerogel (Pd/nGA) Nanoparticle Single-atom Pd particle/nGA was prepared based on the following procedure. 20 mg of Palladium chloride (II) was dissolved into a 5 ml deionized water. Then, 2 ml of hydrochloric acid is added to this solution to make an acidic PH, and then sonication is performed for 1 hour. Then this solution was re-dispersed dropwise into 30 ml of 1 mg/mL graphene oxide aqueous solution and transferred into a 50 mL Teflon-lined stainless-steel autoclave. The mixture was sealed and heated at 180° C. for 3 h and was then left to cool down to room temperature. The product was freeze-dried to maintain the 3D structure at −80° C. overnight.

Example 2: Electron Microscope Analysis

Figure 4A:
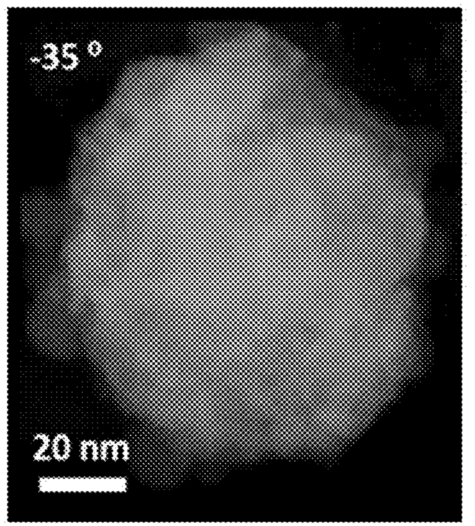
FIGS. 4A(i) to 4A(v) show Cs-corrected scanning transmission electron microscopy (STEM) (tomo-STEM) images (FIGS. 4A(i) to 4A(iii)), a 3D-reconstructed image (FIG. 4A(iv), and a graph of nano-pore size distribution (FIG. 4A(v)) for Pd nanoparticles in Li—PPd/nGA, in accordance with an example of the present disclosure.
Figure 4A:
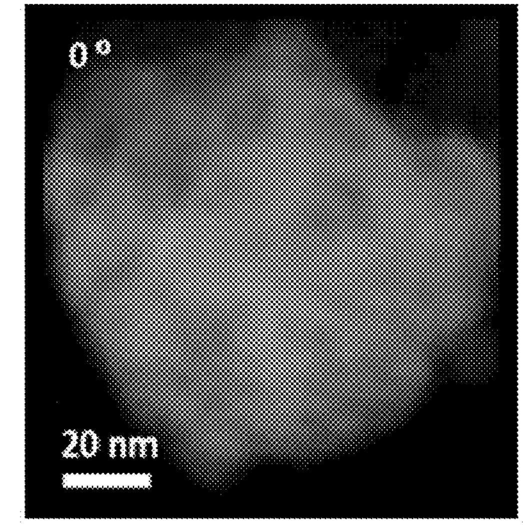
Figure 4A:
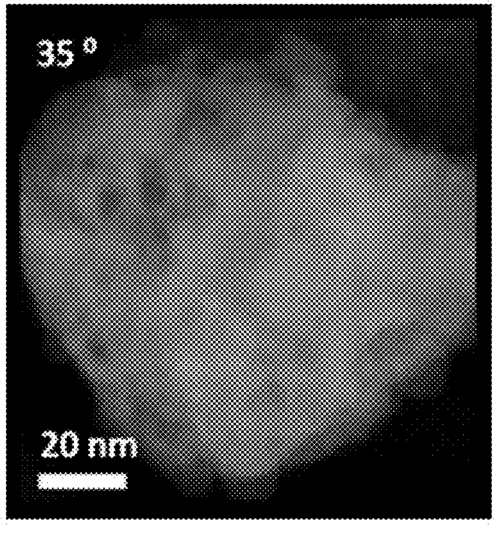
Figure 4A:
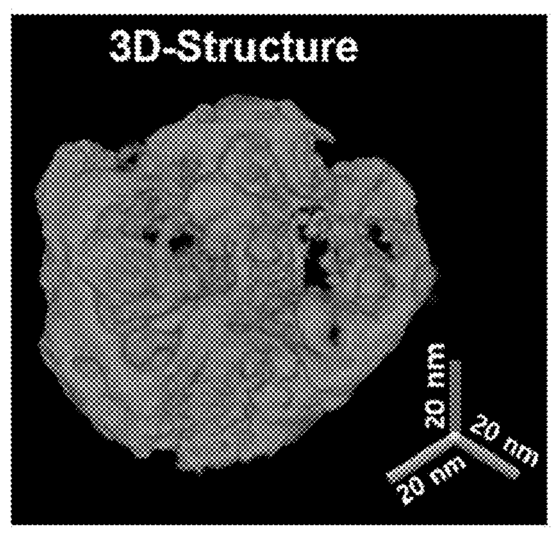
Figure 4A:
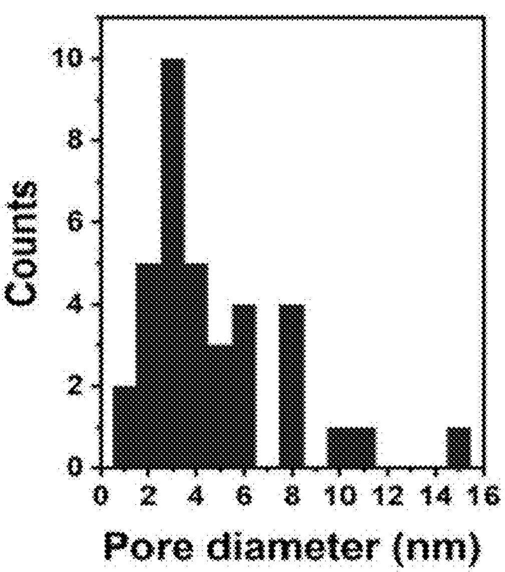
Figure 4B:
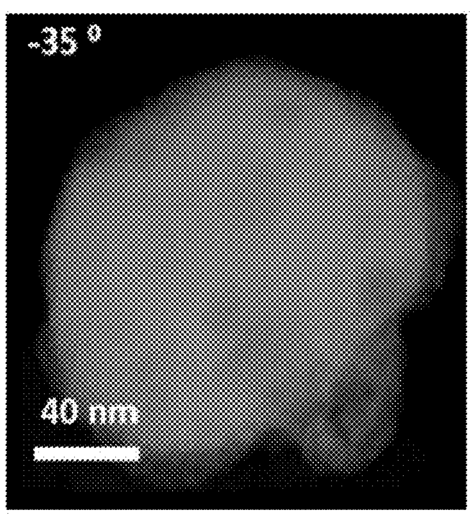
FIGS. 4B(i) to 4B(v) show tomo-STEM images (FIGS. 4B(i) to 4B(iii)), a 3D-reconstructed image (FIG. 4B(iv)), and a graph of nano-pore size distribution (FIG. 4B(v)) for Pd nanoparticles in Pd/nGA, in accordance with an example of the present disclosure.
Figure 4B:
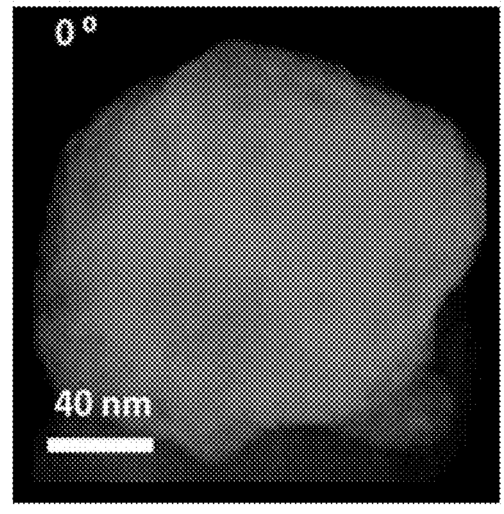
Figure 4B:
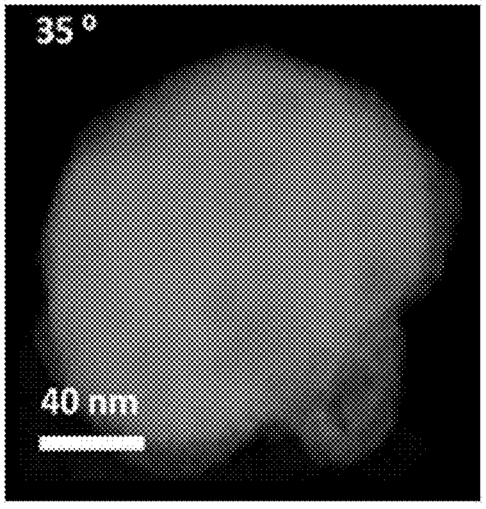
Figure 4B:
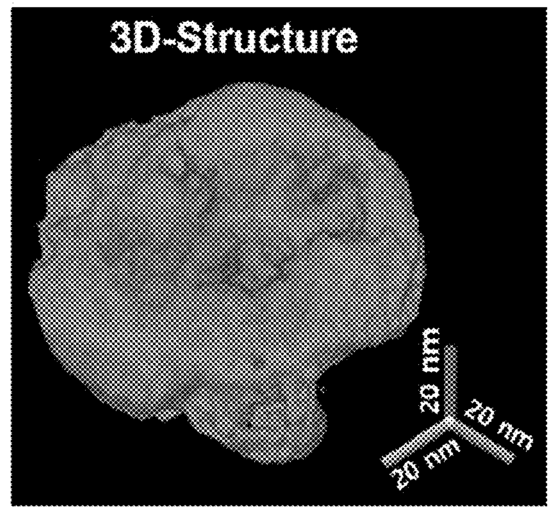
Figure 4B:
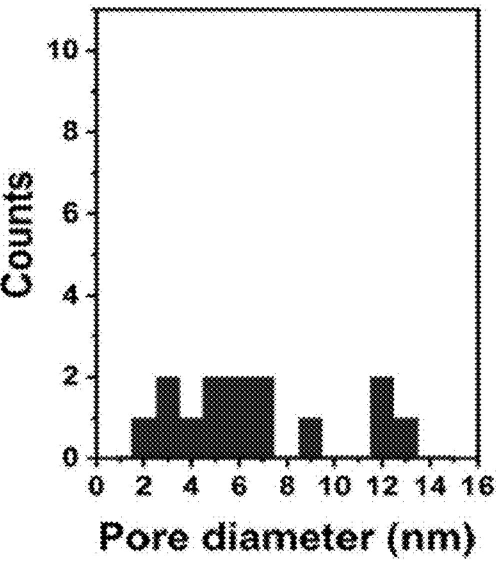
Figure 4C:
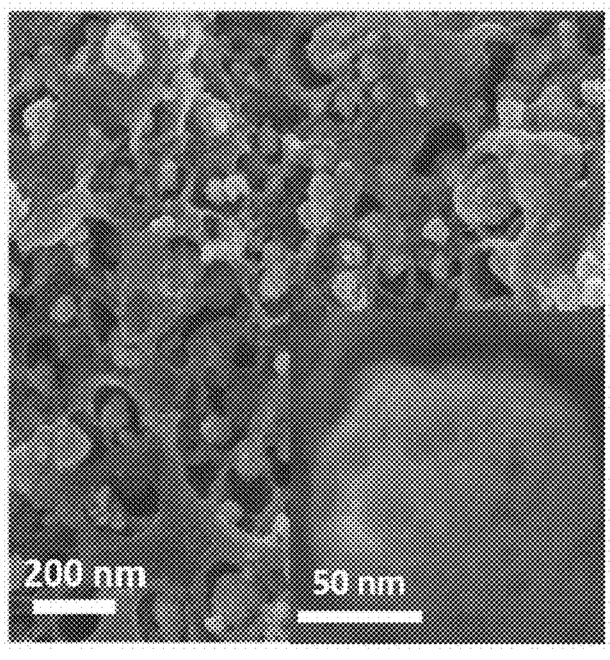
FIG. 4C shows a SEM image of Li—PPd/nGA, in accordance with an example of the present disclosure.
Figure 4D:
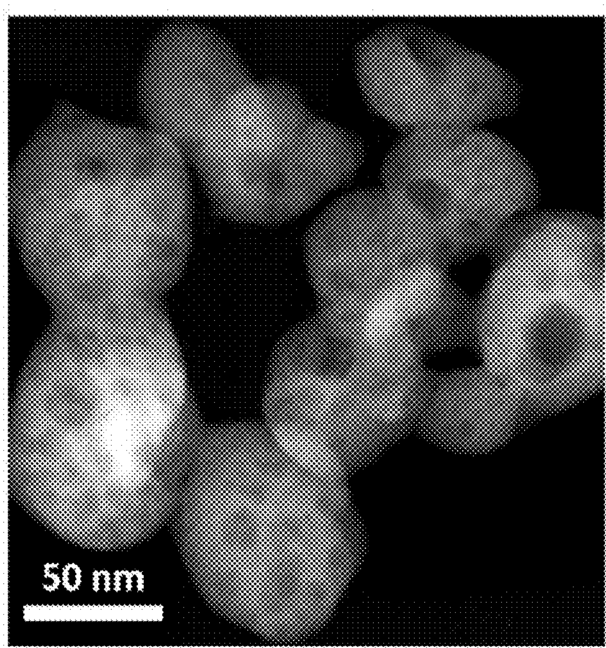
FIG. 4D shows a STEM dark-field image of Li—PPd/nGA, in accordance with an example of the present disclosure.
Figure 4E:
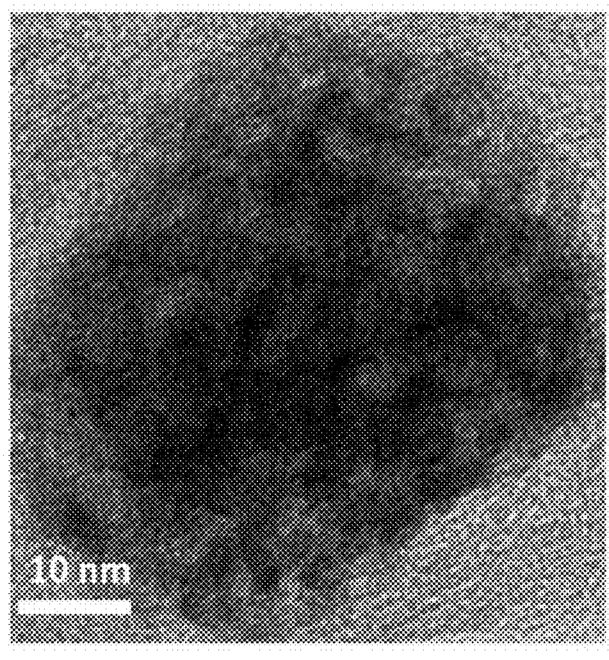
FIG. 4E shows a transmission electron microscopy (TEM) image of Li—PPd/nGA, in accordance with an example of the present disclosure.
Figure 4F:
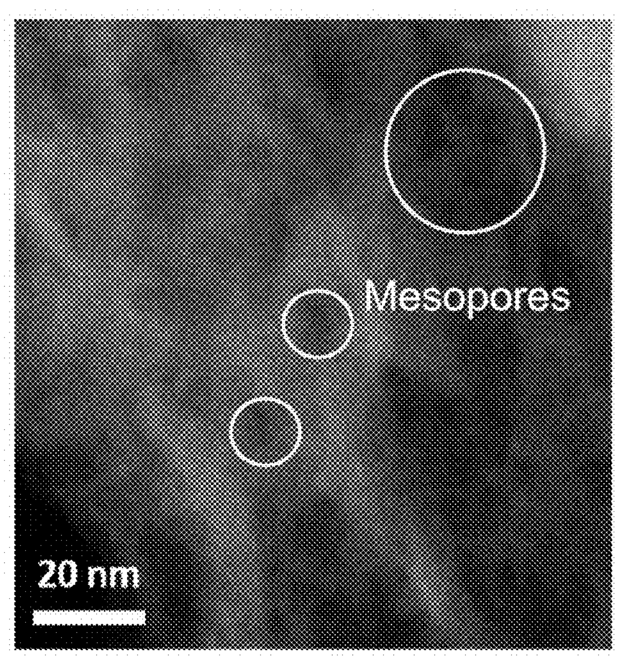
FIG. 4F shows a STEM image of the nGA of Li—PPd/nGA, in accordance with an example of the present disclosure.
Figure 4G:
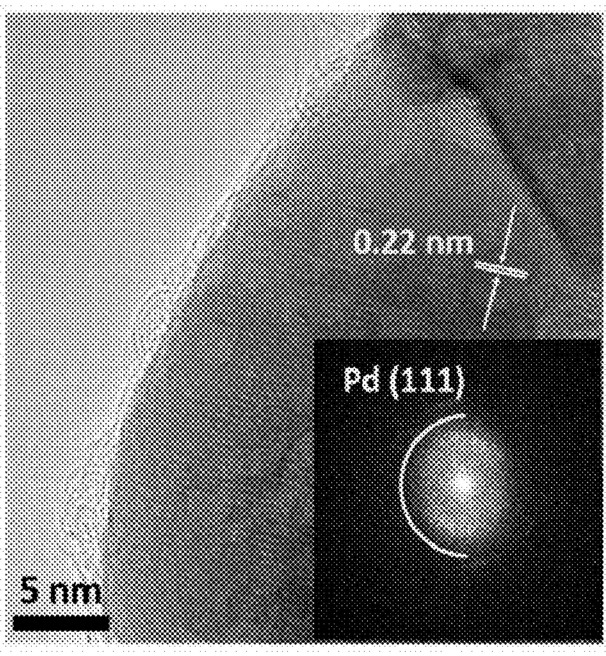
FIG. 4G shows a high-resolution TEM (HRTEM) image of Li—PPd/nGA, in accordance with an example of the present disclosure.
Figure 4H:
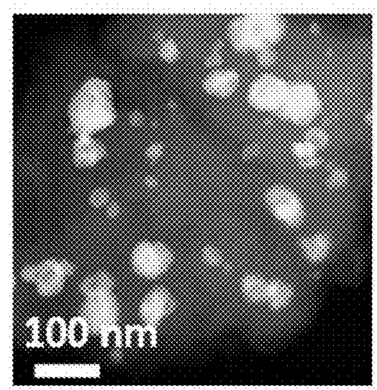
FIGS. 4H(i) to 4H(iv) show STEM elemental mapping images of Li—PPd/nGA, in accordance with an example of the present disclosure.
Figure 4H:
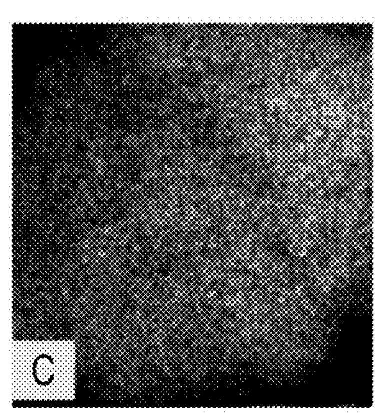
Figure 4H:
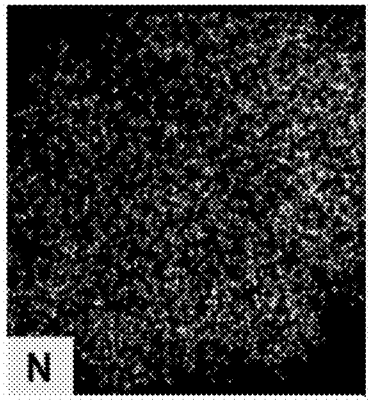
Figure 4H:
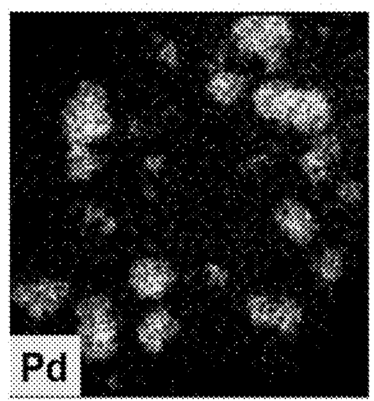
Figure 5:
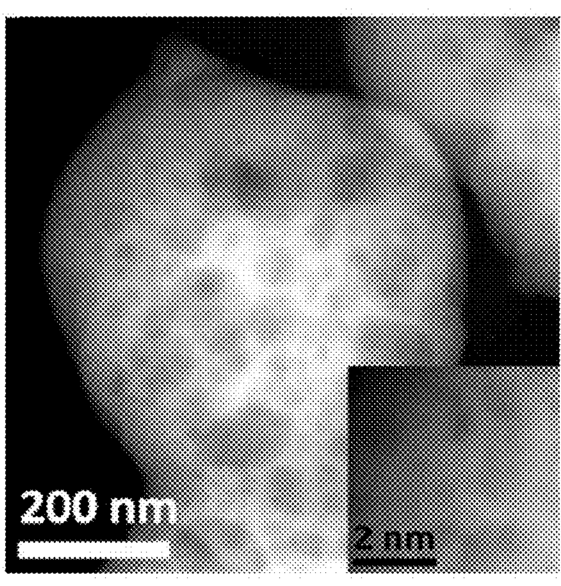
FIG. 5 shows a high-magnification STEM image of the Li—PPd/nGA, in accordance with an example of the present disclosure.
Figure 6A:
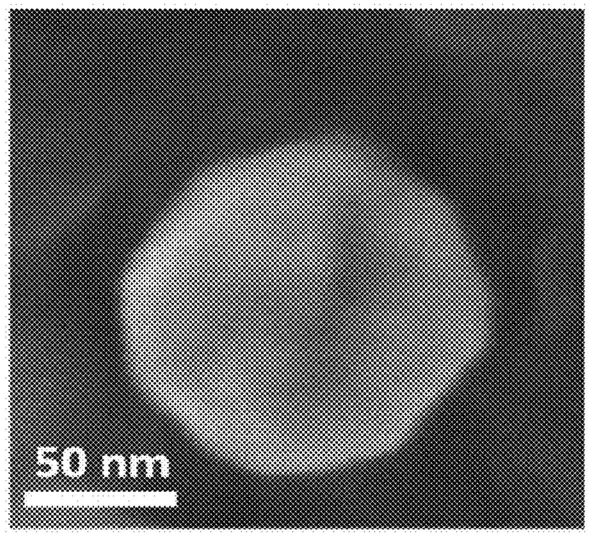
FIGS. 6A to 6C show a SEM image (FIG. 6A), a STEM image (FIG. 6B), and a HRTEM image (FIG. 6C) of PdO/nGA respectively, in accordance with an example of the present disclosure.
Figure 6B:
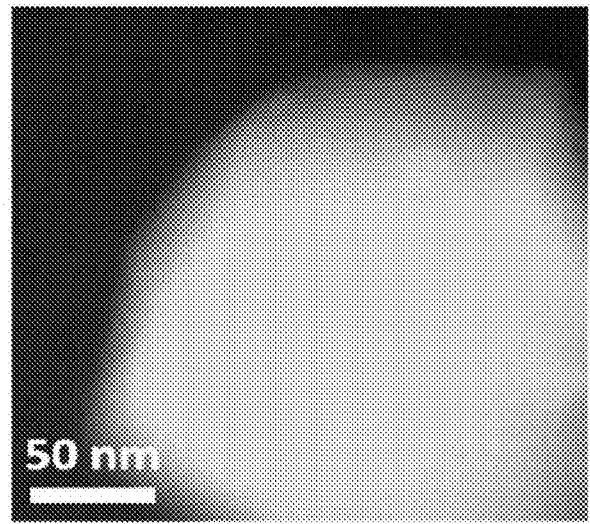
Figure 6C:
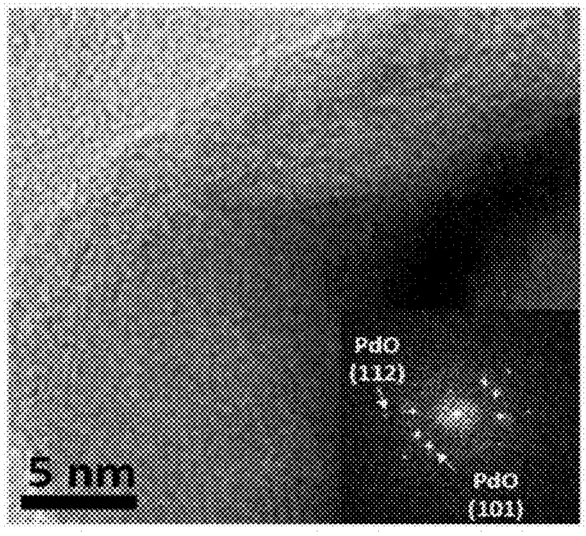

Tomography was utilised to determine the structures of Li—PPd/nGA and Pd/nGA at the atomic-scale resolution. First, the 3D tomography analysis combined with the Cs-corrected scanning transmission electron microscopy (STEM) (tomo-STEM) was performed for microstructure observation at multiple angles by rotating the sample holder from −35° to 35°. Then, the 3D-structured model was reconstructed by the projected images to evaluate the pore size distribution. FIGS. 4A(i) to 4A(v) and FIGS. 4B(i) to 4B(V) show the dark-field tomo-STEM images and 3D-reconstructed images indicating the pore size distribution for Pd nanoparticles in Li—PPd/nGA and Pd/nGA. Before lithiation, the Pd nanoparticles had a smooth surface. Furthermore, few 2-14-nm-sized pores were observed in the pore size distribution graph. However, rough surfaces and numerous pores were observed in the lithiated Pd nanoparticles. In particular, the pore diameters of the Pd nanoparticles in Li—PPd/nGA had a size of 1-10 nm, a proportion of a size of 1-5 nm is high, which agreed with $N_2$ adsorption-desorption isotherm findings. This suggests that the electrochemical reaction induced numerous pores, as observed by changing the viewing angle during 3D tomo-STEM. Moreover, scanning electron microscopy (SEM) images (FIG. 4C) reveal that Li—PPd/nGA is composed of graphene sheets covered with porous Pd particles and has a 3D network structure with hierarchical mesopores. The high-magnification SEM images of Li—PPd/nGA confirm that 50-100-nm-sized Pd particles are densely attached to the rGO sheets and have many nanopores (inset of FIG. 4C). Moreover, Pd particles were observed to be encapsulated in graphene sheets, which is expected to prevent agglomeration and particle loss during the hydrogen dissociation-spillover process. The STEM image (FIG. 4D) also shows a homogeneous distribution of 50-100 nm Pd particles in the graphene sheets. Moreover, the high-magnification TEM image (FIG. 4E) suggests that numerous pores were created on the surface of the Pd particles after the lithiation process. Additionally, the STEM images (FIG. 5) reveal that the Pd particles have nanosized pores (<2 nm). Furthermore, FIG. 4F shows abundant mesopores on the graphene sheets; these mesopores serve as a diffusion pathway, thus allowing the smooth diffusion of hydrogen. In addition, the high-resolution TEM (HRTEM) images of Li—PPd/nGA (FIG. 4G) reveal lattice spacings of 0.22 nm corresponding to the (111) plane of Pd. Additionally, the fast Fourier transformation (FFT) pattern (inset of FIG. 4G), which can be indexed to the (111) plane, confirms the crystalline nature of the Pd particles. The energy-dispersive X-ray spectroscopy profiles (FIGS. 4H(i) to 4H(iv)) indicate the presence of the Pd particles and nitrogen-doped graphene sheets in Li—PPd/nGA. Moreover, the high-magnification SEM images of PdO@Pd/nGA (FIG. 6A) reveal the smooth surface of the PdO particles before the lithiation process. In addition, the STEM images indicate that PdO@Pd/nGA has a smooth surface with few nanopores (FIG. 6B). The HRTEM images of PdO@Pd/nGA (FIG. 6C) reveal the lattice spacings of 0.26 and 0.29 nm corresponding to the (112) and (101) planes of PdO, respectively.

Example 3: Structural Characterization

Figure 7A:
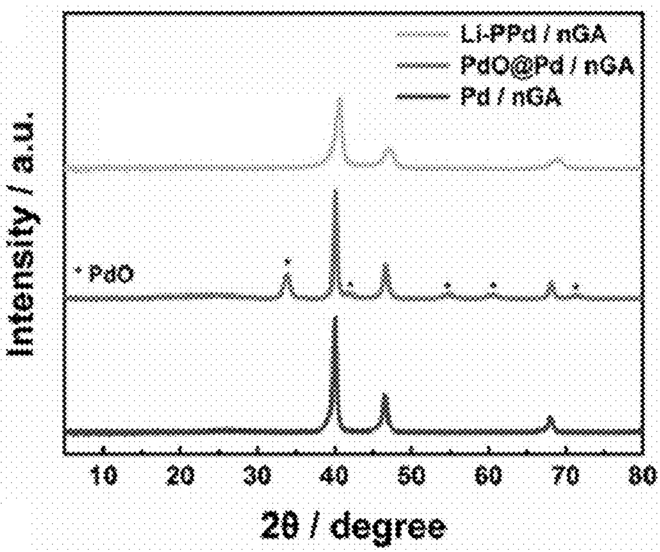
FIG. 7A shows X-ray diffraction (XRD) patterns for Li—PPd/nGA, PdO@Pd/nGA and Pd/nGA, in accordance with an example of the present disclosure.
Figure 7B:
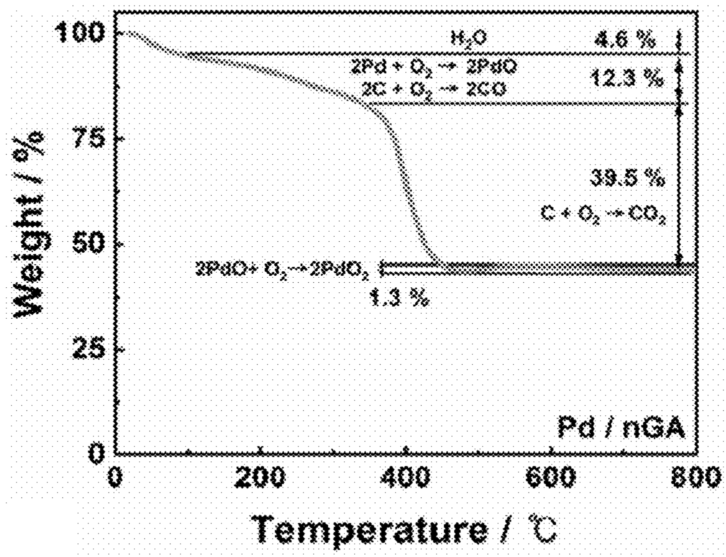
FIG. 7B shows thermogravimetric analysis (TGA) curves of Li—PPd/nGA, in accordance with an example of the present disclosure.
Figure 7C:
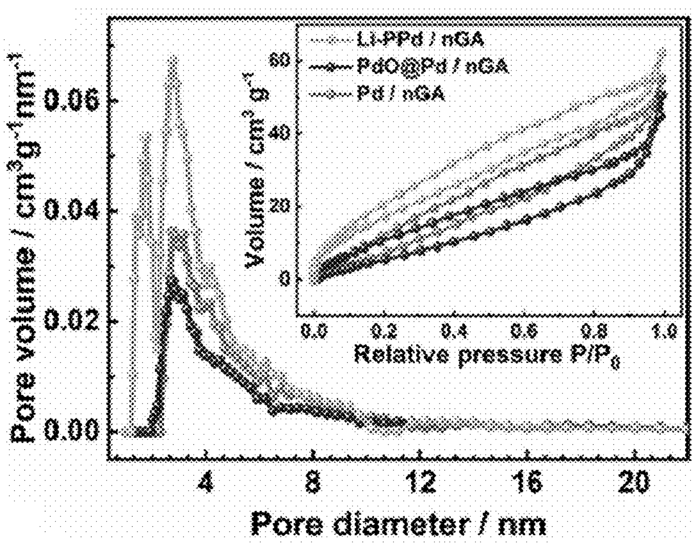
FIG. 7C shows pore size distribution curves of Li—PPd/nGA, PdO@Pd/nGA and Pd/nGA, in accordance with an example of the present disclosure.
Figure 7D:
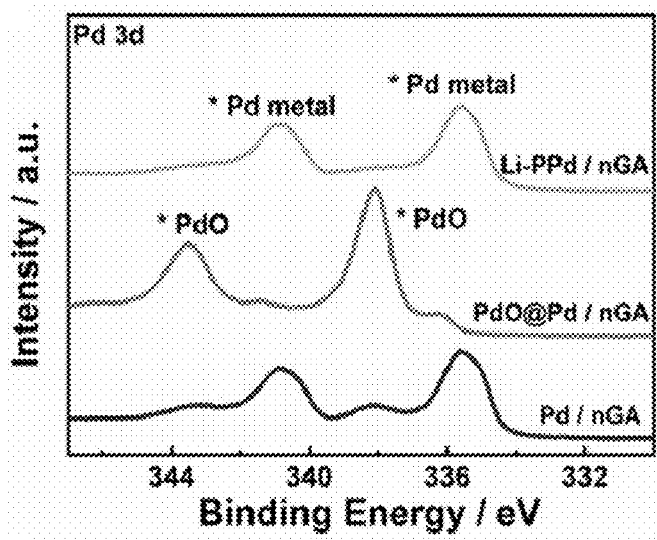
FIG. 7D shows high-resolution X-ray photoelectron spectroscopy (XPS) spectra of the elemental Pd 3d for Li—PPd/nGA, PdO@Pd/nGA and Pd/nGA, in accordance with an example of the present disclosure.
Figure 8A:
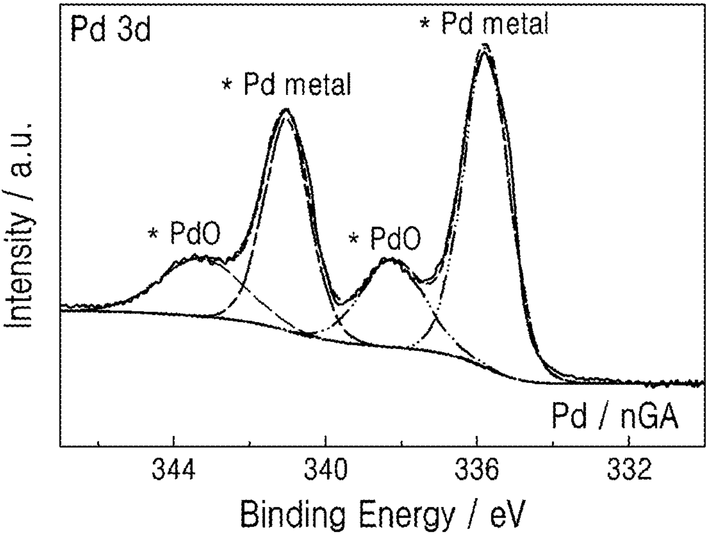
FIGS. 8A to 8C show high-resolution XPS spectra of the elemental Pd 3d for Pd/nGA (FIG. 8A), PdO@Pd/nGA (FIG. 8B) and Li—PPd/nGA (FIG. 8C) respectively, in accordance with an example of the present disclosure.
Figure 8B:
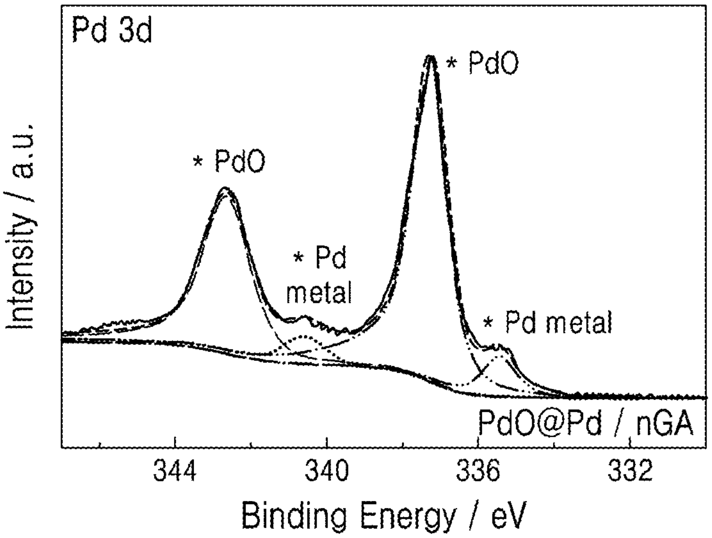
Figure 8C:
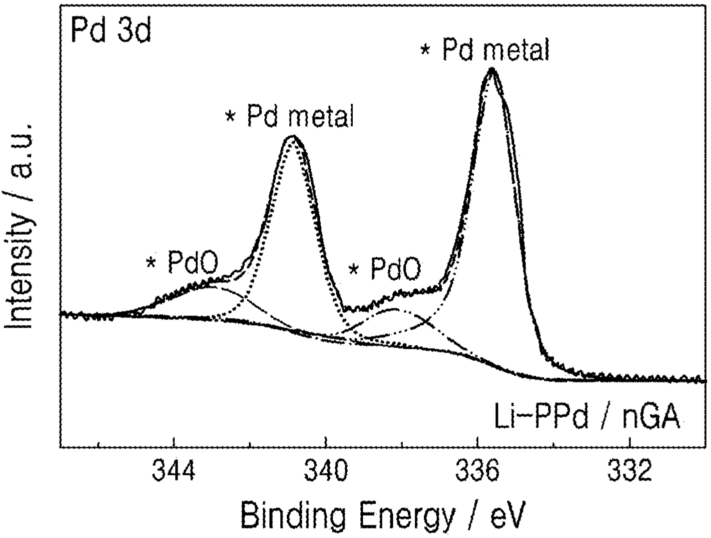

FIG. 7A depicts the powder X-ray diffraction measurements. In the case of Pd/nGA, three main peaks were observed at 40.04°, 46.54°, and 68.02°, assigned to the (111), (200), and (220) planes, respectively, indicating the face-centred cubic structure of Pd (JCPDS card #46-1043). In contrast, in the X-ray diffraction (XRD) pattern of Pd@PdO/nGA, the phase reflections of the (101), (110), (112), (200), and (211) planes were indexed to the peaks at 33.88°, 41.88°, 54.66°, 60.52°, and 71.52°, respectively (JCPDS card #43-1024). This indicates that the PdO phase was formed from the metallic Pd nanoparticle surface via annealing. After lithiation, only a metallic Pd phase was detected in the XRD pattern of Li—PPd/nGA, indicating that PdO was reduced to metallic Pd by reacting with two Li atoms, resulting in $LiO_2$ as the product. In addition, thermogravimetric analysis (FIG. 7B) shows that the saturated value at 43.74% is attributed to PdO. In addition, the $N_2$ adsorption-desorption isotherm using the Brunauer-Emmett-Teller method was conducted to measure the specific surface area, as depicted in the inset image of FIG. 7C. The isotherms for all samples were categorised as type-4, indicative of mesoporous structures. The surface area tended to decrease with the thermal treatment from 49.3 $m^2/g$ for Pd/nGA to 38.6 $m^2/g$ for PdO@Pd/nGA; this decrease was due to surface oxidation. However, the specific surface area of Li—PPd/nGA was 74.4 $m^2/g$, indicating that the electrochemical lithiation process induced porosity in the Pd nanoparticles. In particular, the density functional theory analysis (FIG. 7C) revealed that the mesopores between 2.5 nm and 3.5 nm were newly generated only in Li—PPd/nGA. Additionally, to investigate the surface chemical binding states and compositions, we obtained the X-ray photoelectron spectroscopy (XPS) spectra of Pd 3d, C 1s, and N 1s. FIG. 7D shows that metallic Pd has two peaks at 335.58 eV and 340.88 eV, assigned to $Pd^0$ $3d_{5/2}$ and $Pd^0{}_{3/2}$, respectively, and divalent Pd oxide has peaks at 338.11 eV and 343.04 eV for $Pd^{2+}$ $3d_{5/2}$ and $Pd^{2+}{}_{3/2}$, respectively. The Pd 3d XPS spectra for Pd/nGA (FIG. 8A) indicate that most of the Pd atoms existed as metal states, while a small amount of $Pd^{2+}$ ions were detected owing to presence of the native PdO layer on the surface. In the case of Pd@PdO/nGA annealed in an air atmosphere (FIG. 8B), most of the peak area corresponded to the PdO state, indicating that all the Pd on the surface was oxidised to PdO during the heat treatment process. On the contrary, in the case of Li—PPd/nGA, most of the Pd elements existed as Pd metal states, as clarified by the following Reaction Formula 2 that proceeded during the lithiation process (FIG. 8C).

$$PdO+2Li+2e^- \rightarrow Pd+LiO_2; \quad \text{[Reaction Formula 2]}$$

Figure 7E:
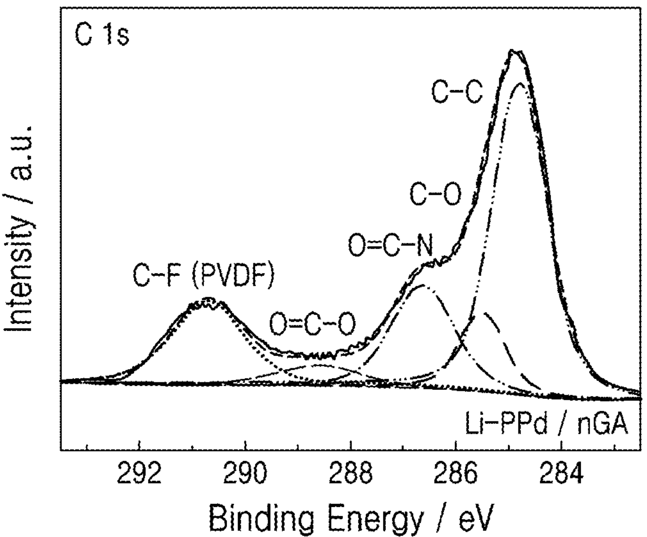
FIG. 7E shows high-resolution XPS spectra of the elemental C 1s for Li—PPd/nGA, in accordance with an example of the present disclosure.
Figure 7F:
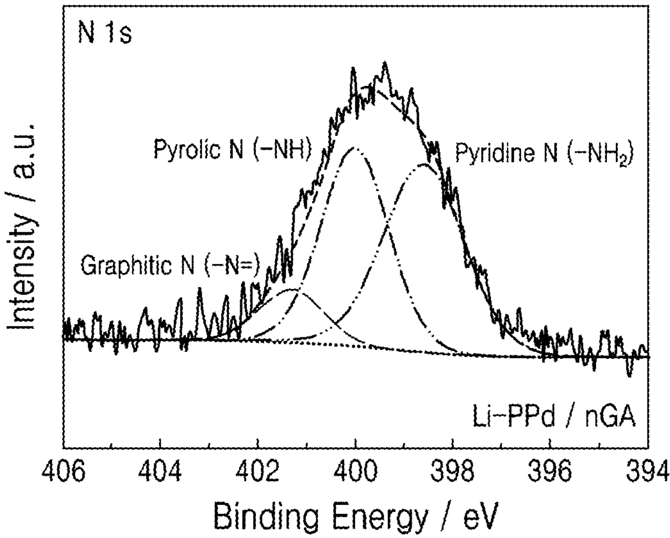
FIG. 7F shows high-resolution XPS spectra of the elemental N 1s for Li—PPd/nGA, in accordance with an example of the present disclosure.
Figure 9A:
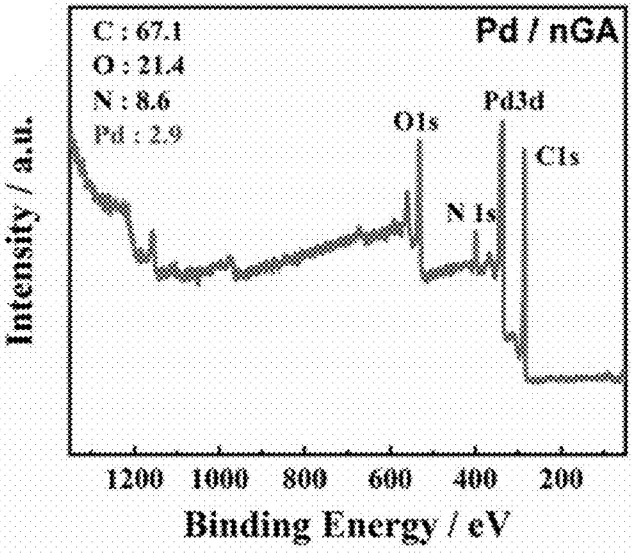
FIGS. 9A and 9B show XPS spectra for Pd/nGA (FIG. 9A) and Li—PPd/nGA (FIG. 9B) respectively, in accordance with an example of the present disclosure.
Figure 9B:
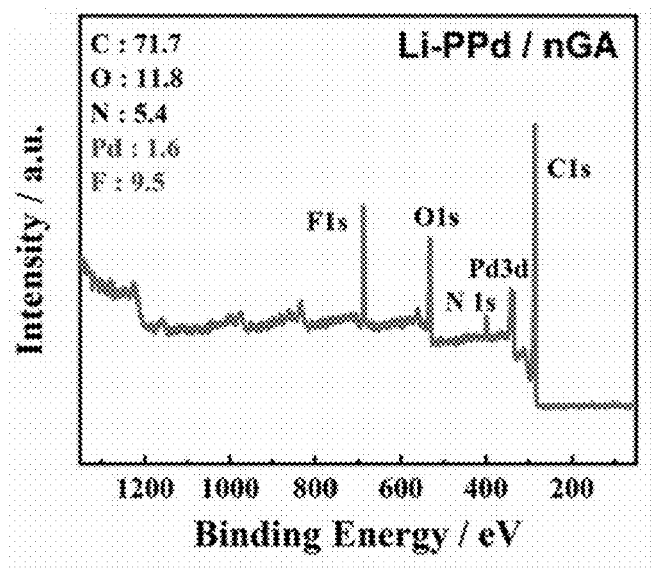

The C 1s XPS spectra were measured to clarify the effects of the lithiation process on nGA. The C 1s could be deconvoluted by C—C, C—O, O═C—N, O═C—O, $CF_2$, and I═π*, detected at 284.8 eV, 285.5 eV, 286.6 eV, 288.6 eV, 290.8 eV, and 291.0 eV, respectively, as depicted in FIG. 7E. The results indicate that the lithiation led to an increased amount of C—C bonds, preferable for rapid hydrogen migration. In addition, FIGS. 9A and 9B shows that the ratio of C increased from 67.1% to 71.7%, enabling the formation of larger C—H bonds via spillover. Moreover, the N 1s XPS spectra for Li—PPd/nGA (FIG. 7F) revealed the three main nitrogen doping species, namely pyridinic-N (398.2 eV), pyrrolic-N (400.2 eV), and graphitic N (401.4 eV). Nitrogen doping affects the barriers of hydrogen dissociation and migration, indicating that the doped nitrogen species in Li—PPd/nGA play a role in enhancing the hydrogen spillover.

Example 3: Reversible Hydrogen Storage Performance Evaluation

Figure 10A:
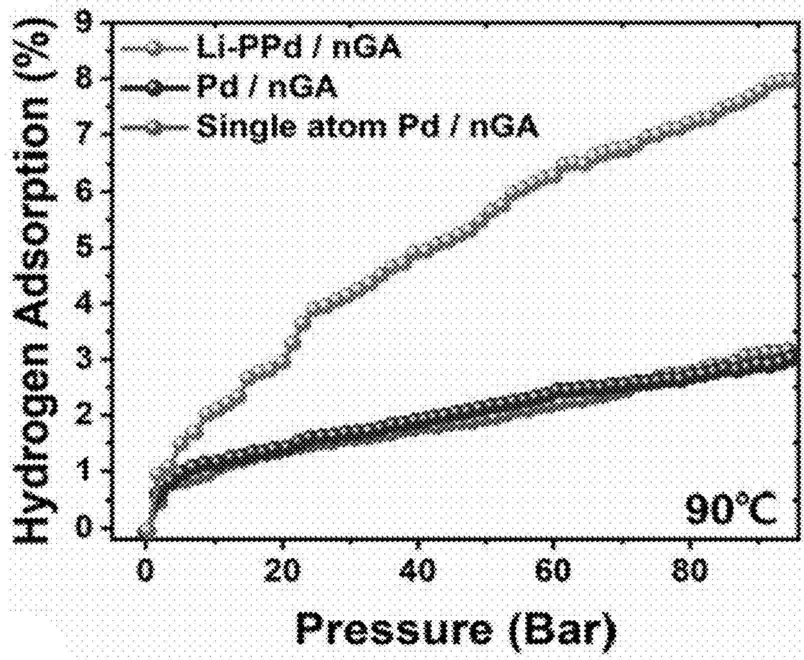
FIG. 10A shows hydrogen adsorption curves for Li—PPd/nGA, Pd/nGA, and single atom Pd particle/nGA, in accordance with an example of the present disclosure.
Figure 10B:
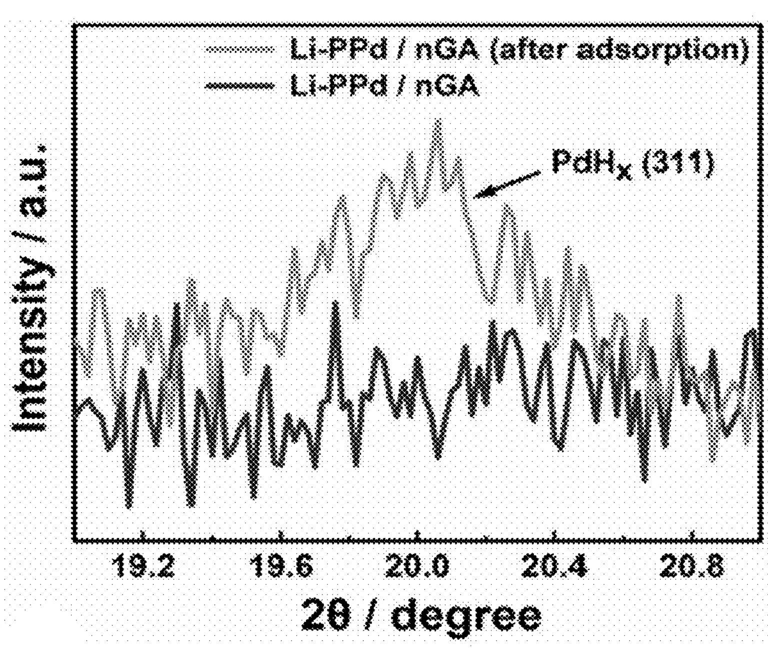
FIG. 10B shows XRD curves for Li—PPd/nGA before and after hydrogen storage process, in accordance with an example of the present disclosure.
Figure 10C:
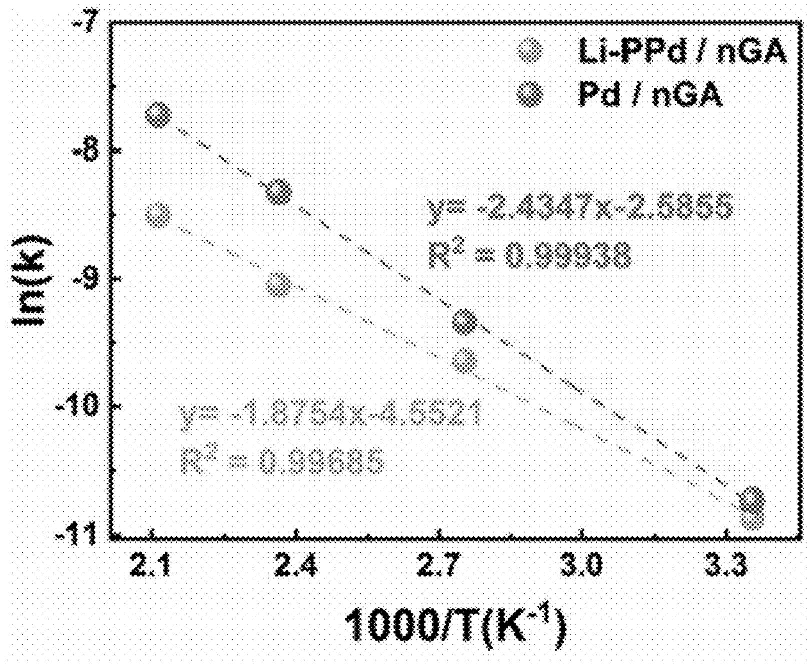
FIG. 10C shows arrhenius plots of activation energy calculation for Li—PPd/nGA and Pd/nGA, in accordance with an example of the present disclosure.
Figure 10D:
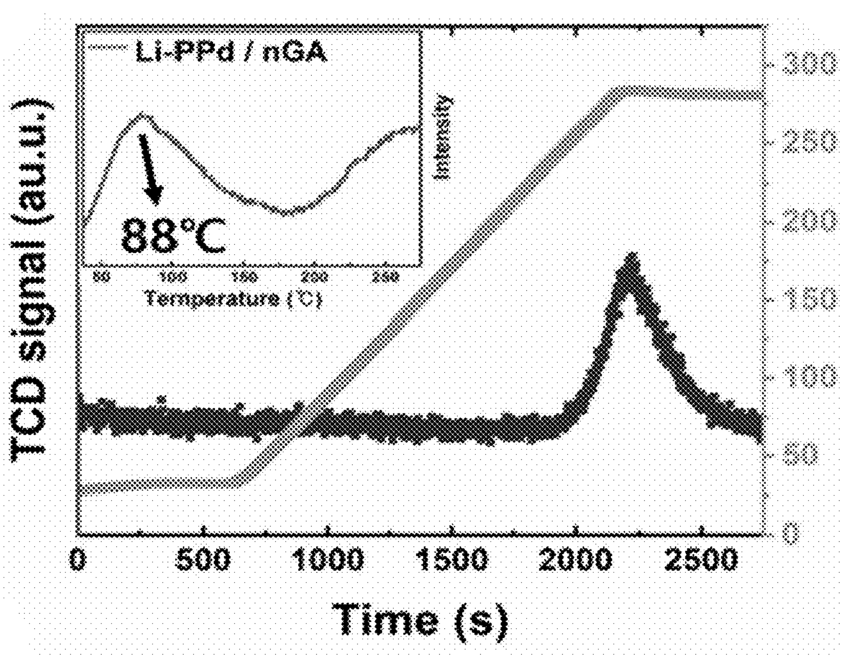
FIG. 10D shows temperature-programmed desorption measurements using a mass spectrometer (TPD-MS) curves for Li—PPd/nGA, in accordance with an example of the present disclosure.
Figure 10E:
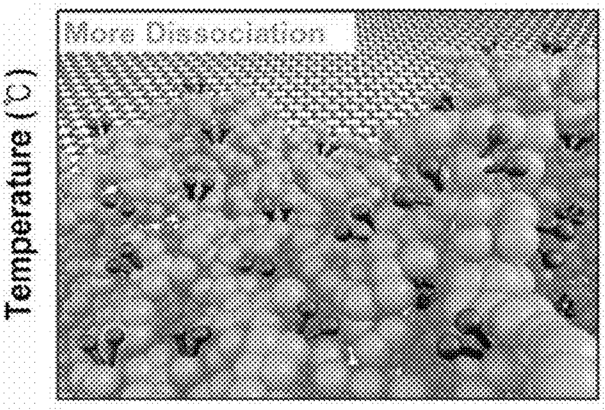
FIGS. 10E(i) and 10E(ii) show a schematic of hydrogen storage mechanism of Li—PPd/nGA through hydrogen spillover, in accordance with an example of the present disclosure.
Figure 10F:
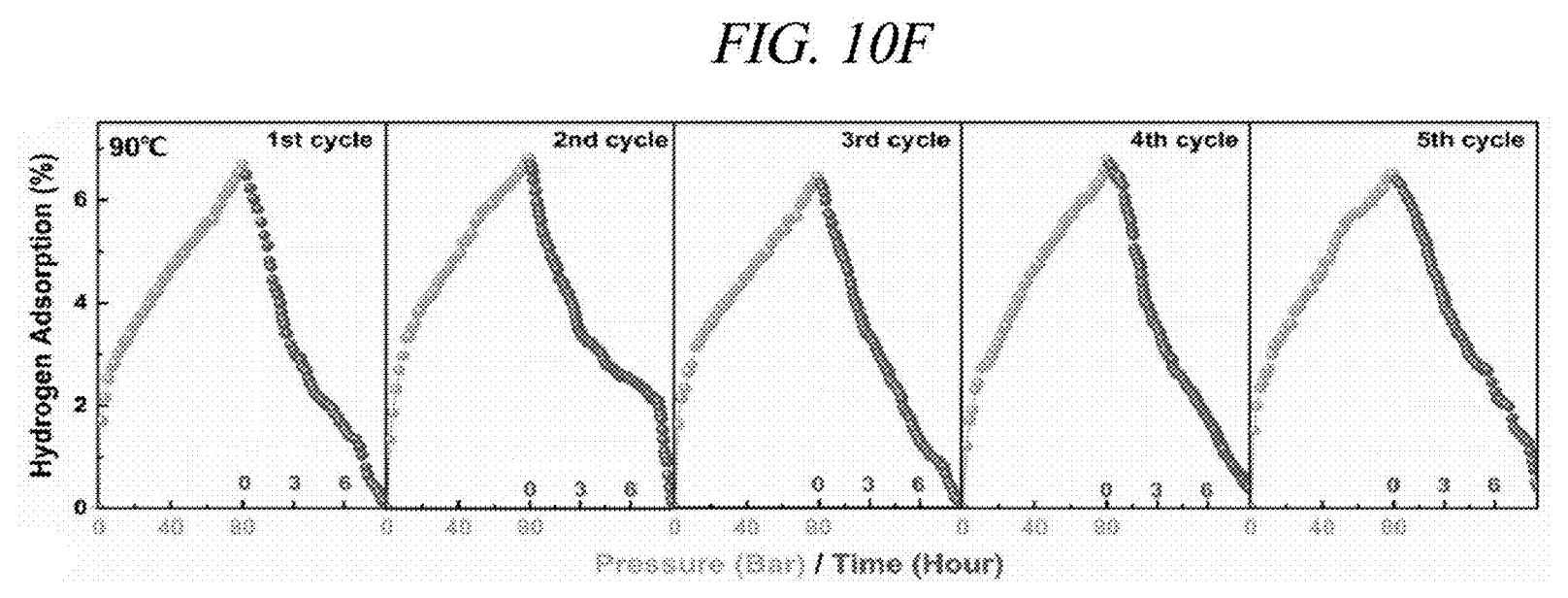
Figure 10G:
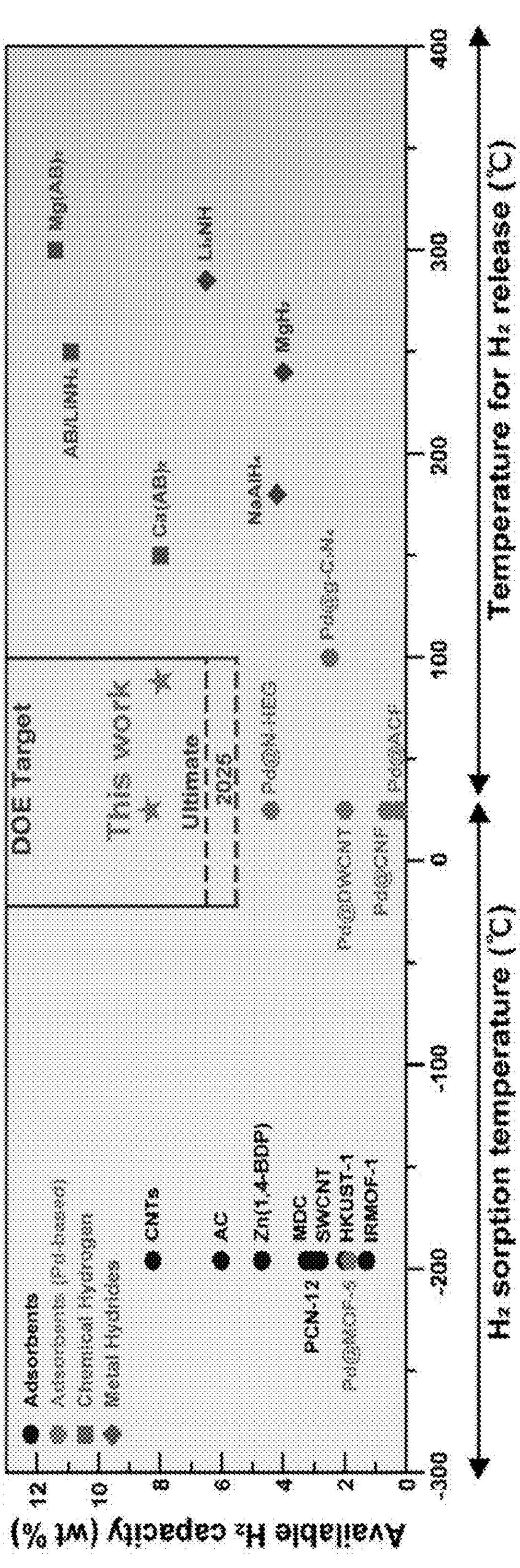
FIG. 10G shows available hydrogen storage capacities on Li—PPd/nGA in accordance with an example of the present disclosure and hydrogen materials with different types of mechanisms.
Figure 11A:
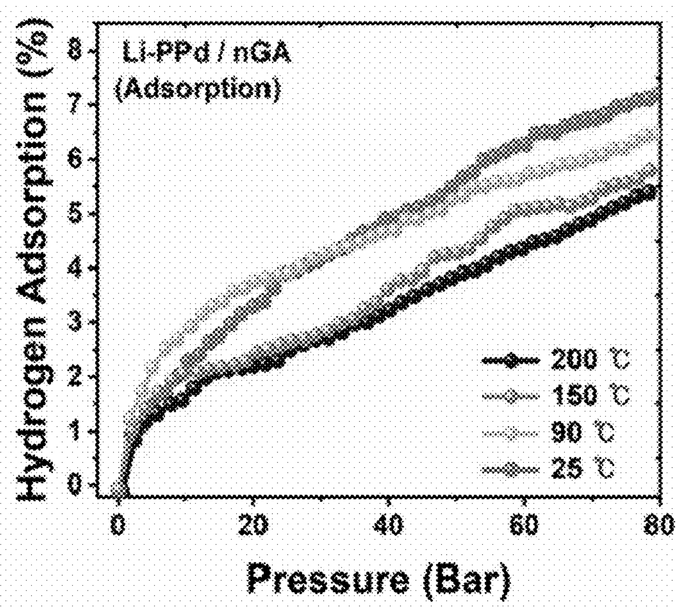
FIGS. 11A and 11B show hydrogen adsorption (FIG. 11A) and desorption (FIG. 11B) curves of Li—PPd/nGA at various temperatures respectively, in accordance with an example of the present disclosure.
Figure 11B:
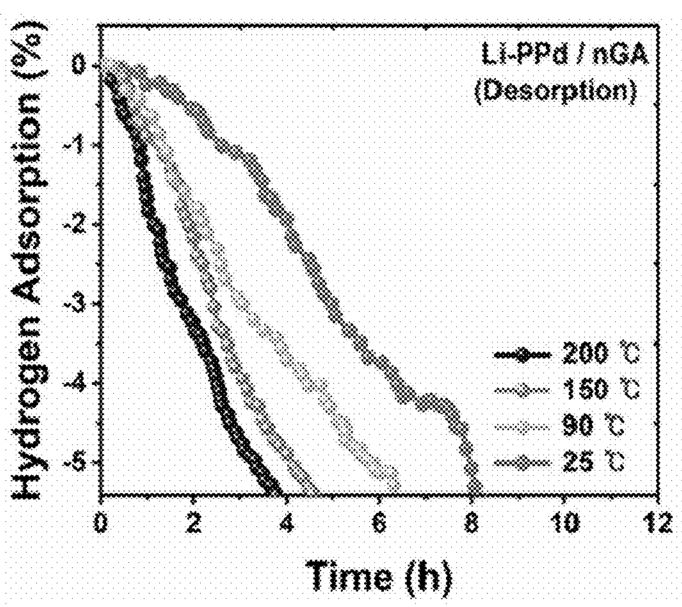
Figure 12:
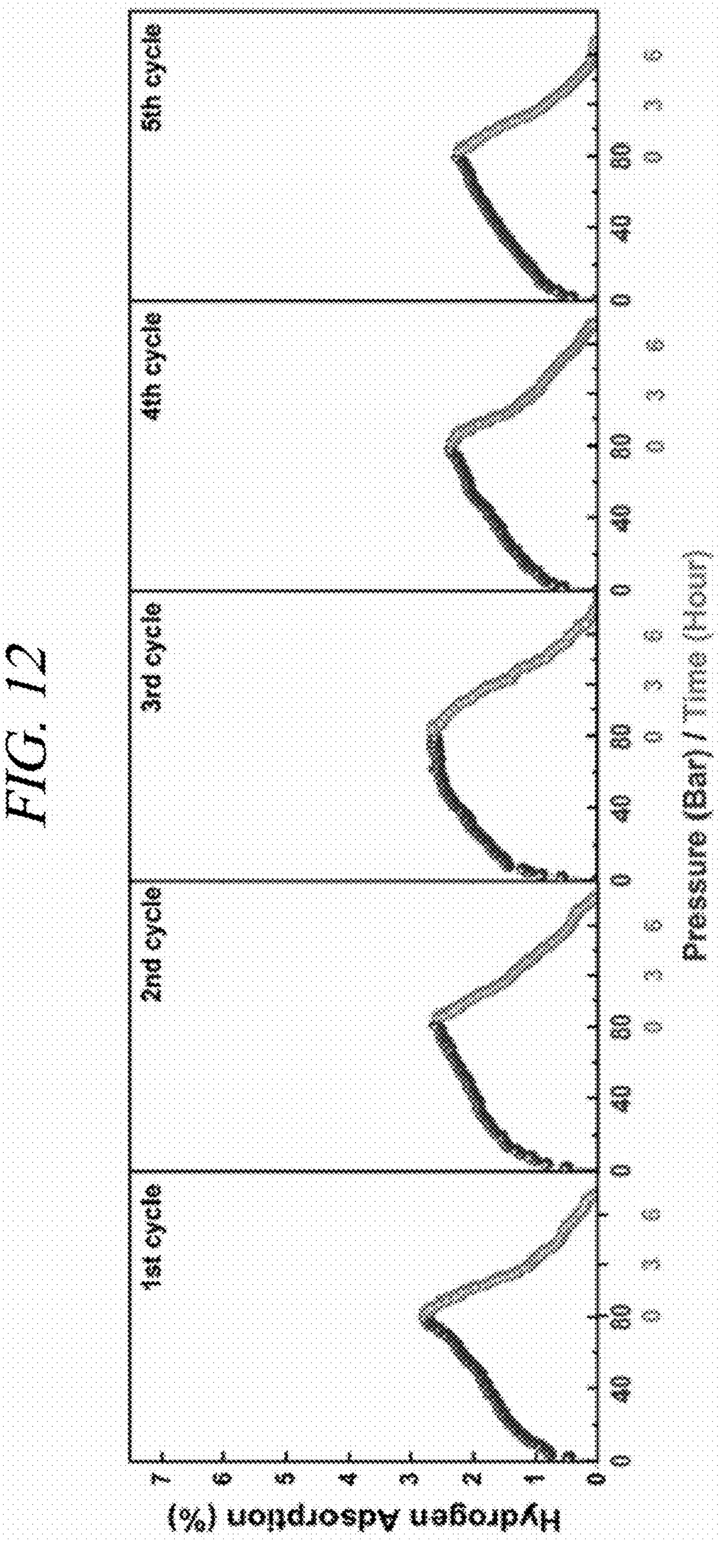
FIG. 12 shows hydrogen adsorption and desorption curves cycle of single-atom Pd/nGA at 90° C., in accordance with an example of the present disclosure.

FIG. 10A depicts the hydrogen adsorption curves for Li—PPd/nGA, Pd/nGA, and single-atom Pd particles/nGA at a temperature of 90° C. Li—PPd/nGA demonstrated the highest hydrogen uptake of 7.96 wt. % at 95 bar. This indicates that porous Pd particles provide facile hydrogen adsorption via spillover. Single-atom Pd particles exhibited a hydrogen storage performance of only approximately 3.16 wt. %. This is because single-atom Pd particles exhibit a contact surface area as large as that of bulk porous Pd; therefore, hydrogen adsorption occurs effectively, but dissociation does not occur easily owing to their low surface energy. Furthermore, the XRD data (FIG. 10B) demonstrated clear evidence of the spillover mechanism, where the porous Pd of Li—PPd/nGA exhibited a PdHx phase during hydrogen storage. The activation energies ($E_a$) for hydrogen absorption were further determined for Li—PPd/nGA and Pd/nGA by analysing the hydrogenation curves using a Kolmogorov-Johnson-Mehl-Avrami (KJMA) model (FIG. 10C). By fitting the data points, the activation energies of approximately 15.6 $kJ \cdot mol^{-1}$ for $E_a$ (Li—PPd/nGA) and 20.3 $kJ \cdot mol^{-1}$ for $E_a$ (Pd/nGA) were obtained. This indicates that $E_a$ was significantly reduced through a lithiation process, enabling Li—PPd/nGA to exhibit approximately a five-fold faster hydrogen spillover at room temperature (25° C.) compared to that of non-porous Pd/nGA. Moreover, FIG. 10D depicts the hydrogen desorption properties of Li—PPd/nGA through temperature-programmed desorption measurements using a mass spectrometer (TPD-MS). TPD experiments (FIG. 10D, inset) were performed to elucidate the hydrogen desorption mechanism. First, the hydrogen gas pretreatment demonstrated a peak with a vertex at 88° C. for hydrogen desorption. This implies that most of the adsorbed hydrogen during the pretreatment could be detached from the sample at a relatively low temperature. Moreover, the Li—PPd/nGA treated with pre-adsorption at moderate pressures of hydrogen using a pressure-composition-temperature (PCT) instrument was analysed with the TPD-MS to explore the hydrogen adsorption mechanism. The thermal conductivity detector signal at 220° C. was related to the chemisorbed surface hydrogen, consistent with the existence of PdHx, as depicted in FIG. 10B. In addition, FIG. 11A depicts the hydrogen adsorption performance of Li—PPd/nGA at different temperatures. The hydrogen capacity decreased slightly as the temperature increased, which was attributed to the exothermic enthalpy of the hydrogen dissociation process. Similarly, FIG. 11B reveals that hydrogen desorption is preferable at an increased room temperature because the main step of the spillover process is an endothermic reaction. These results indicate that the hydrogen storage mechanism of Li—PPd/nGA proceeds through spillover. FIGS. 10E(i) and 10E(ii) illustrates the hydrogen storage of Pd/nGA and Li—PPd/nGA. In the case of Pd/nGA, hydrogen molecules can be adsorbed on the smooth surface; however, this adsorption is insufficient to enable rapid dissociation and migration because the hydrogen atoms need to diffuse into the core structures of Pd nanoparticles with a size of 50-100 nm. In contrast, the electrochemically induced porous Pd structures allow the hydrogen molecules to adsorb on the graphene sheets. Sufficient hydrogen adsorption reactions also facilitate the hydrogen dissociation and migration of hydrogen atoms, thereby resulting in ultrahigh hydrogen capacities compared to that of Pd/nGA and even single-atom Pd/nGA. FIG. 10F illustrates the cycle performance for hydrogen adsorption/ desorption on Li—PPd/nGA at 90° C. At 80 bar, the first cycle exhibited a hydrogen storage performance of 6.5 wt. % and the fifth cycle indicated that the performance was maintained at approximately 6.4 wt. %. This supports the notion that porous Pd particles are stable without collapse. Furthermore, the porous Pd particles were in good contact with the graphene sheets, such that the Pd particles were not lost during the repeated cycles. However, the single-atom Pd particles/nGA exhibited a decrease in the hydrogen storage performance after five cycles and poor structural stability during hydrogen storage (FIG. 12). FIG. 10G and the following Table 1 summarize the available hydrogen gravimetric capacities for hydrogen storage materials.

TABLE 1

| Type | Material | Temperature (° C.) | Hydrogen capacity (wt. %) | Reference |
|---|---|---|---|---|
| Adsorbent (Pd-based) | Li-PPd@nGA | 25 | 8.29 | This work |
| | | 90 | 7.96 | |
| | Pd@CNF | 25 | 0.59 | S1 |
| | Pd@DWCNT | 25 | 2.0 | S2 |
| | Pd@ACF | 25 | 0.23 | S3 |
| | Pd@MOF-5 | −196 | 1.86 | S4 |
| | Pd@g-$C_3N_4$ | 100 | 2.5 | S5 |
| | Pd@N-HEG | 25 | 4.4 | S6 |
| Adsorbent | IRMOF-1 | −196 | 1.3 | S7 |
| | PCN-12 | −196 | 3.05 | S8 |
| | Zn(1,4-BDP) | −196 | 4.7 | S9 |
| | HKUST-1 | −196 | 2.0 | S10 |
| | MDC | −196 | 3.25 | S11 |
| | CNTs | −196 | 8.24 | S12 |
| | SWCNT | −196 | 2.8 | S13 |
| | AC | −196 | 6.02 | S14 |
| Chemical hydrogen | AB/$LiNH_2$ | 250 | 10.9 | S15 |
| | $Ca(AB)_2$ | 150 | 8 | S16 |
| | $Mg(AB)_2$ | 300 | 11.4 | S17 |
| Metal hydride | $NaAlH_4$ | 180 | 4.2 | S18 |
| | $MgH_2$ | 240 | 4.0 | S19 |
| | $Li_2NH$ | 285 | 6.5 | S20 |

Most adsorbents are metal-organic frameworks and activated carbons with a high porosity and large surface area; however, hydrogen can be stored only at a low temperature of −196° C. In contrast, metal hydrides and chemical hydrogen storage materials, such as ammonia borane, require high temperatures (at least 150° C.) to release hydrogen, so that they are not suitable for applications at room temperature. In contrast, the hydrogen spillover promoted by porous Pd particles on nGA enables a high reversible capacity of at least 7.96 wt. % at room temperature, thus providing a solution to achieve the DOE ultimate target (6.5 wt. %).

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A composite for hydrogen storage, comprising:
a nitrogen-doped graphene aerogel; and
a porous metal nanoparticle formed on a surface of the nitrogen-doped graphene aerogel,
wherein the nitrogen-doped graphene aerogel is composed of a reduced graphene oxide single layer, and
wherein the nitrogen-doped graphene aerogel and the porous metal nanoparticle have pores.

2. The composite of claim 1,
wherein the porous metal nanoparticle is Pd, Pt, Ni, or Co.

3. The composite of claim 1,
wherein the porous metal nanoparticle becomes porous through an oxidation process and a lithiation; and lithium removal process.

4. The composite of claim 1,
wherein a size of the porous metal nanoparticle is 10 nm to 200 nm.

5. The composite of claim 1,
wherein a size of the pore of the porous metal nanoparticle is 1 nm to 10 nm.

6. The composite of claim 1,
wherein hydrogen spillover occurs when hydrogen molecules adsorbed to the porous metal nanoparticle are dissociated to hydrogen atoms and the hydrogen atoms migrate to the nitrogen-doped graphene aerogel.

7. The composite of claim 1,
wherein a hydrogen capacity of the composite for hydrogen storage is 5 wt % to 10 wt %.

8. The composite of claim 1,
wherein a hydrogen adsorption activation energy of the composite for hydrogen storage is 15 kJ·mol-1 to 20 kJ·mol-1.

9. A method of preparing a composite for hydrogen storage, comprising:
oxidizing a nitrogen-doped graphene aerogel-metal nanoparticle composite; and
forming pores by performing a lithiation process and a lithium removal process to the oxidized nitrogen-doped graphene aerogel-metal nanoparticle composite to obtain the composite for hydrogen storage according to claim 1.

10. The method of claim 9,
wherein the metal nanoparticle is Pd, Pt, Ni, or Co.

11. The method of claim 9,
wherein the nitrogen-doped graphene aerogel-metal nanoparticle composite is formed by growing the metal nanoparticle on a nitrogen-doped graphene aerogel.

12. The method of claim 9,
wherein the lithiation process is electrochemically performed.

13. The method of claim 9,
wherein the lithium removal process is performed by washing the nitrogen-doped graphene aerogel-metal nanoparticle composite after the lithiation process.

14. A hydrogen carrier comprising the composite for hydrogen storage according to claim 1.

* * * * *